(12) United States Patent
Mathews et al.

(10) Patent No.: US 11,897,123 B2
(45) Date of Patent: Feb. 13, 2024

(54) ANIMATED ROBOTS HAVING VARYING DEGREES OF AUTONOMY AND ANTHROPOMORPHISM

(71) Applicant: Modest Robot, LLC, Austin, TX (US)

(72) Inventors: Brian Mathews, Austin, TX (US); Alan Johnson, Austin, TX (US); Micah Nolte, Austin, TX (US)

(*) Notice: Subject to any disclaimer, the term of this patent is extended or adjusted under 35 U.S.C. 154(b) by 514 days.

(21) Appl. No.: 16/821,217

(22) Filed: Mar. 17, 2020

(65) Prior Publication Data

US 2021/0291385 A1  Sep. 23, 2021

(51) Int. Cl.
*A63H 29/22* (2006.01)
*B25J 17/00* (2006.01)
*A63H 30/04* (2006.01)
*B25J 18/00* (2006.01)

(52) U.S. Cl.
CPC .............. *B25J 17/00* (2013.01); *A63H 29/22* (2013.01); *A63H 30/04* (2013.01); *B25J 18/007* (2013.01); *A63H 2200/00* (2013.01)

(58) Field of Classification Search
CPC .... A63H 33/042; A63H 33/046; A63H 33/16; B25J 9/08; B25J 9/123; B25J 9/126; A61B 46/10
See application file for complete search history.

(56) References Cited

U.S. PATENT DOCUMENTS

| 7,255,624 B2 * | 8/2007 | Daftari | A63H 33/22 446/485 |
| 7,947,050 B2 * | 5/2011 | Lee | A61B 34/71 606/130 |
| 9,011,197 B2 * | 4/2015 | Smoot | A63F 9/34 446/362 |
| 9,814,998 B2 * | 11/2017 | Wei | A63H 33/046 |
| 10,926,187 B2 * | 2/2021 | Kennedy | A63H 33/26 |
| 2017/0326466 A1 * | 11/2017 | Chae | G06K 7/1413 |
| 2018/0168752 A1 * | 6/2018 | Scheib | B29C 65/02 |
| 2018/0229142 A1 * | 8/2018 | Brandwijk | A63H 33/103 |
| 2022/0193571 A1 * | 6/2022 | Lim | A63H 33/107 |

FOREIGN PATENT DOCUMENTS

DE 202017104838 U1 * 10/2017

* cited by examiner

*Primary Examiner* — Gregory Robert Weber
(74) *Attorney, Agent, or Firm* — Mason A. Gross; The Law Office of Mason A. Gross, PLLC

(57) ABSTRACT

A fun and affordable animated toy robot operates with varying degrees of autonomy and anthropomorphism. The robot may include a customized chipboard controller or computer, a power source, and may be constructed with specialized connectors, magnets, servo motors, generally less-sturdy (or pliable) thin materials, such as chipboard, card stock, cardboard, or the like, used for the body and limbs of the robot, and LEDs. The specialized connectors may be used to attach the servos to these materials. An application and the controller may be used to control the motion of the robot. Young children may be able to make the attachments to build the robot with little or without the help of adults or older children. Building and operating the robot may be fun activities for children and families, and may provide enjoyable learning activities about robotics.

17 Claims, 32 Drawing Sheets

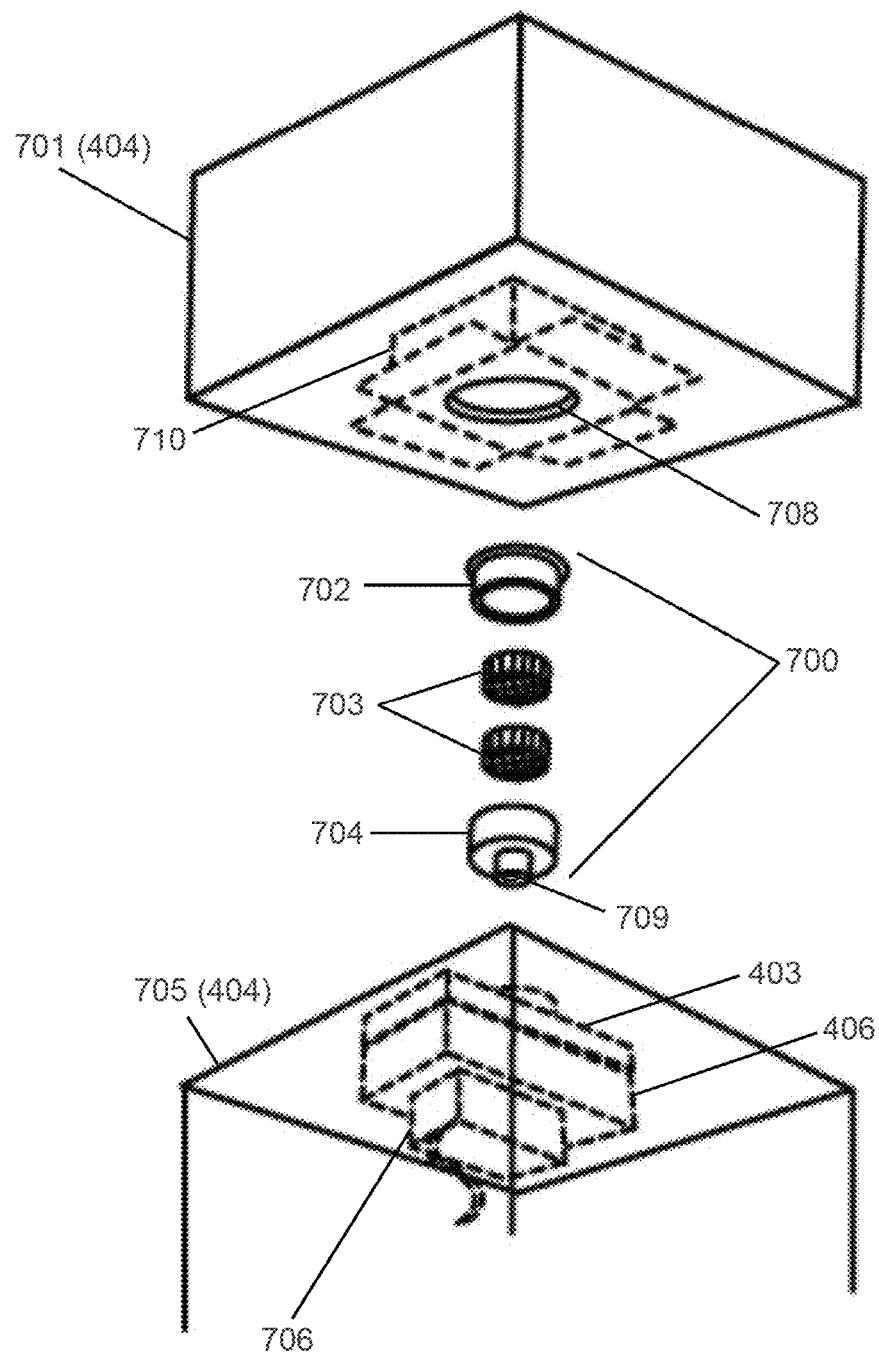

1300

ANIMATED ROBOTS HAVING VARYING DEGREES OF AUTONOMY AND ANTHROPOMORPHISM

BACKGROUND

Field of the Invention

The invention is generally related to a robot, and, more particularly, to an animated toy robot that operates with varying degrees of autonomy and anthropomorphism through the use of a computer, tablet, handheld device, such as a smartphone, or the like, a control or controller module having a controller board or control unit board, servo motors ("servos"), power sources, communications hardware, and software.

Description of the Related Art

Advancements in science, technology, engineering and mathematics ("STEM") will be important for the future. Achieving and reaping the benefits of these advancements always will require getting young people interested and involved in STEM. Some companies and organizations are creating and marketing STEM-related products as part of efforts to attract young people to learn about and pursue STEM-related activities. For example, companies that contribute to these efforts include: Dash Robotics, Inc., which markets small programmable plastic toys and robots; Ubtech, which markets programmable plastic robots as Jimu Robot Kits, having parts that snap together; Elenco Electronics, Inc., which markets, among other products, a programmable robot product, Zivko the Robot, also having parts that snap together; and Fat Brain Holdings, LLC, which markets metal and plastic RC robots under the service mark, Fat Brain Toys®. Accordingly, there is a market for STEM-related products, such as programmable robots, and room for other companies to enter this market.

SUMMARY

In accordance with embodiments of the invention, methods, apparatus, and systems provide for the attachment of servos or mini servos to generally less-sturdy (or pliable) thin materials (e.g., from approximately 0.5 mm to 3.0 mm thick inclusive with approximately meaning ±0.05 mm), such as chipboard, paper stock, card stock, cardboard, or the like. Such embodiments may allow young children to be able to make these attachments without the help of an adult or older child or sibling. Also, such embodiments may provide visually appealing methods of making such attachments, and may do so in an economical, cost-effective manner, for example, by using specially designed printed circuit boards (PCBs) manufactured in numbers, each having a microprocessor (processor) or microcontroller (control module), specially designed connectors, servos, LEDs, and dual-axis gear reducer motors.

In accordance with embodiments of the invention, a robot or "bot" (robot or bot may be used interchangeably herein) may provide a craft/DIY project for children, which may be equally entertaining and educational for adults. The robot may be custom-designed by a user, customer, or purchaser by selecting various accessories and features to include in their design, or they may choose to use or purchase one of a set or a standard model. The creative use of the chipboard as the robot body assembly medium may provide an excellent canvas that may be drawn or painted on, have stickers applied to it, and even be modified in many other creative ways to customize the robot.

In accordance with embodiments of the invention, a user, customer, or purchaser ("user") may control the robot using a remote (e.g., mobile) application over either a wireless network, local-area network, or Bluetooth, or the like, or over a combination of a wired and a wireless network. In certain embodiments, the robot (or "bot") may be controlled using a wired remote control (FIG. 26) for customers who do not possess a smartphone or computer.

In accordance with embodiments of the invention, a controllable and programmable robot may be constructed having a system for the attachment of mechanical and electronic devices, such as servos having rotors, to chipboard paper. These components may be controlled with a manufactured or custom PCB, or a prototype board, as described below. The system of attachment includes using a novel adapter that allows the servos to be connected to portions of the robot, for example, using magnetic connections on other portions, which allows for connecting the servo and chipboard together.

In accordance with embodiments of the invention, a website may be provided, which gives the users the ability to design their own robot by selecting accessories, selecting stickers, adding visual design templates to their robot, or the like, as described above, which may be printed on the chipboard prior to shipping to the user.

In accordance with embodiments of the invention, apparatus, systems, and methods are disclosed for the connection of electrical components, such as servos, to thin flexible materials having surfaces, such as paper, cardboard, chipboard, or the like. In some of these embodiments, novel structures, apparatus, and techniques are disclosed for securely connecting servos, in constructing or assembling robots, to thin chipboard materials for use in enabling animation and motion of various components or structures of the robots. Such embodiments may also provide secure connections or couplings between servos and thin materials, for example, materials ranging in thickness from 0.5 mm to 3.0 mm inclusive (as above), for which it might be otherwise to obtain firm and secure connections or couplings. For example, such connections or couplings between these components may be accomplished by sandwiching the cardboard, chipboard, plastic, thin materials, or the like between inner and outer connector components or structures. These connector components or structures may provide for securely holding the servos in place relative to the surface or surfaces of the cardboard, chipboard, plastic, thin materials, or the like.

The embodiments described herein provide an affordable, easily found, and fun atmosphere for families to learn about robotics and how to build robots.

BRIEF DESCRIPTION OF THE DRAWINGS

FIGS. 7A and 7B illustrate a connector for a robot head appendage to a robot body or torso, in exploded perspective views, in accordance with embodiments of the invention.

DETAILED DESCRIPTION

Figure 1:
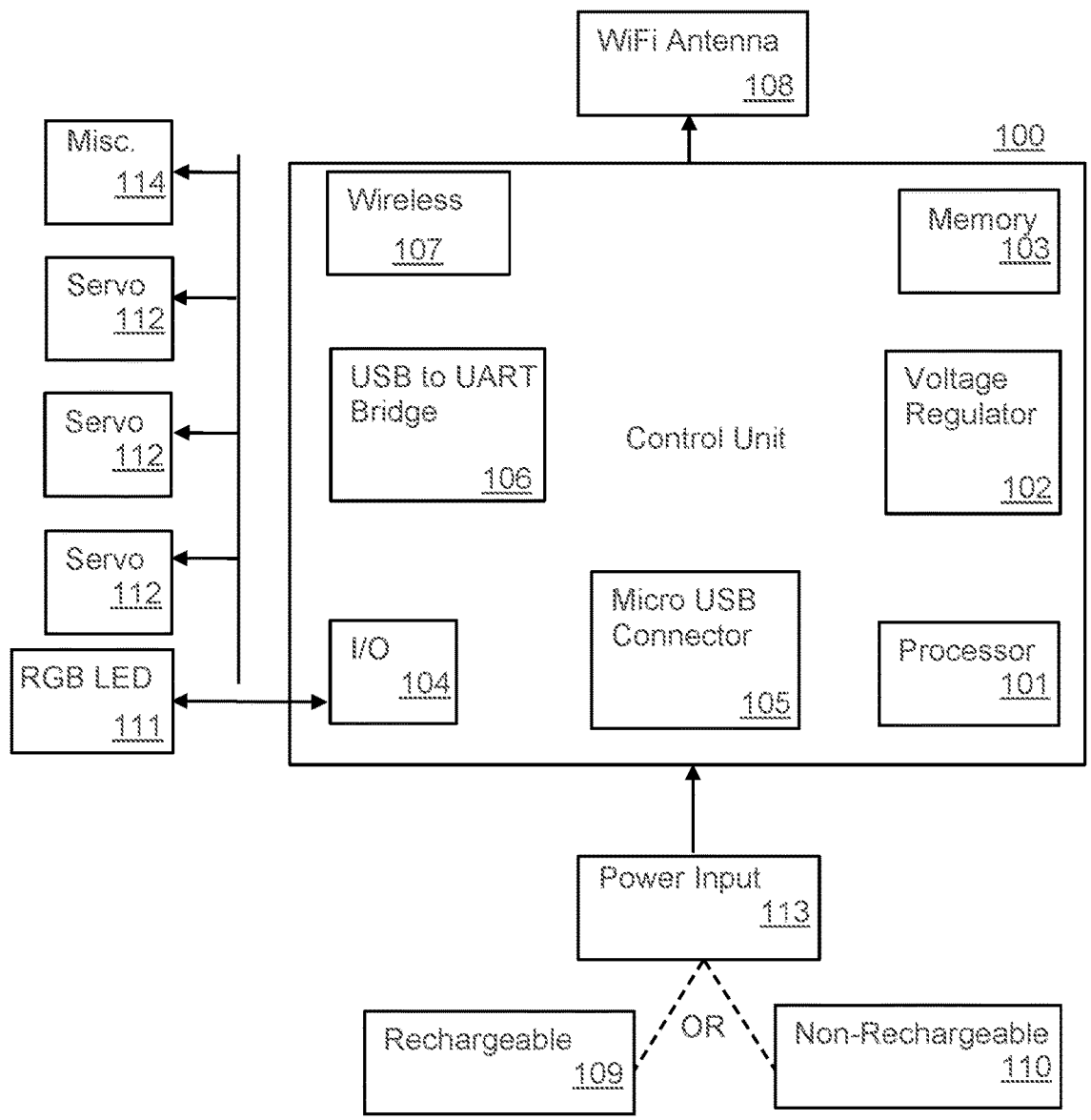
FIG. 1 is a block diagram of the controller module or unit, in accordance with embodiments of the invention.
Figure 2A:
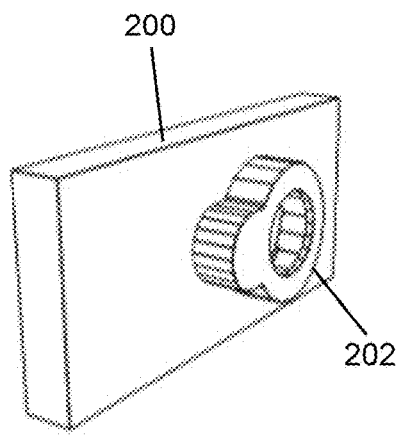
FIGS. 2A (perspective outside view), 2B (outside view), 2C (long side view), 2D (inside view), and 2E (short side view) illustrate, an outer magnetic connector, in accordance with embodiments of the invention.
Figure 2B:
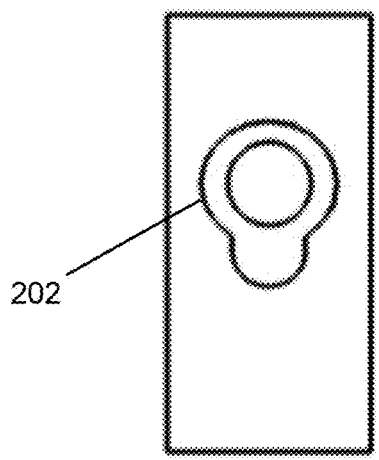
Figure 2C:
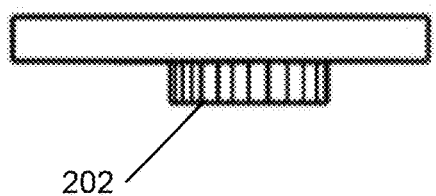
Figure 2D:
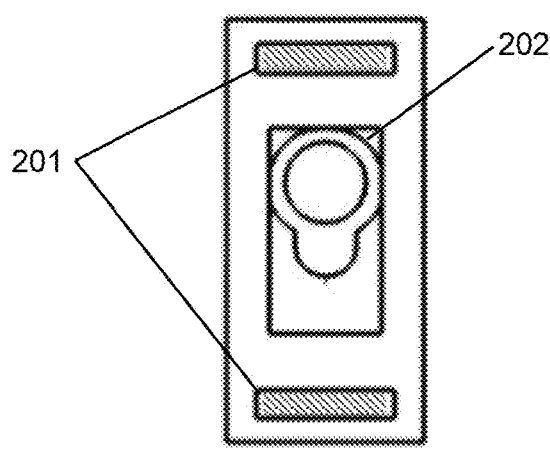
Figure 2E:
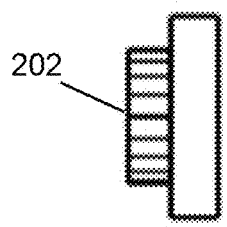
Figure 3A:
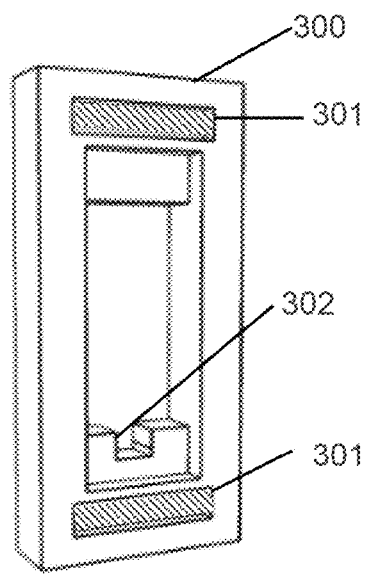
FIGS. 3A (perspective inside view), 3B (inside view), 3C (outside view), and 3D (long side view) illustrate, an inner magnetic connector, in accordance with embodiments of the invention.
Figure 3B:
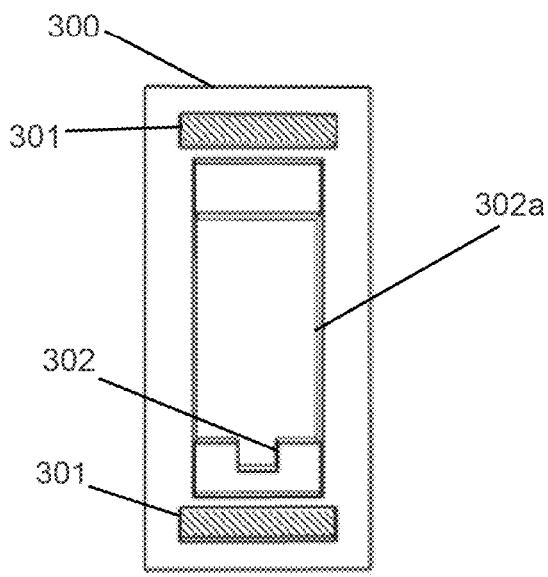
Figure 3C:
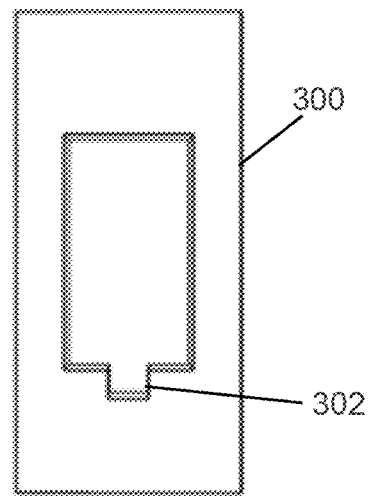
Figure 3D:
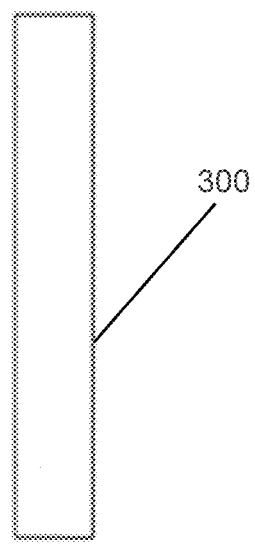

In accordance with embodiments of the invention, a mechanical connector, coupler, or structure that may be used for connecting, coupling, holding, or securing the micro servos used for robotic motion or movement to the cardboard, chipboard, plastic, thin materials, or the like of the robot includes an inner connector portion (also referred to herein as an inner connector or a first connector) and an outer connector portion (also referred to herein as an outer connector or a second connector). Exemplary embodiments for these inner and outer connector portions, which will be described further below, include:

1) Magnetic inner and outer connector portions
2) Clipping inner and outer connector portions
3) Locking inner and outer connector portions One or more of these exemplary embodiments may be included in the robot or work together with other exemplary embodiments of other connectors or couplers, which include:

1) Magnetic servo connector for robot appendages
2) Magnetic connector for robot appendages In accordance with embodiments of the invention, a custom application (app) is disclosed in which users may connect or couple to a robot for communications and control via a wireless connection or network (e.g., a wireless local local-area network (LAN)) that uses, for example, WiFi or Bluetooth. The robot control app (RC App) may be installed and run on a computer, such as a PC or MAC, or on a handheld or mobile device, such as an Android device or an Apple iOS device, or on other computer systems (all hereinafter, "user control device") to control the robot. Certain embodiments may optionally additionally or instead include a plug-in controller, control unit, or electronic module for hardwire communications pathways between the controller and the robot, such as wires, USB, a bus(es), or the like, for use in addition to the wireless connection or when other communication devices or apparatus are available.

The controller board or control unit board 100 (FIG. 1) may be a special purpose and dedicated programmable unit contained in the controller module. The control unit board 100 may include a custom printed circuit board (PCB) and power and passive components, as described below. The control unit board 100 may be programmed to initialize, activate, and control the robot. For example, upon activation of the controller module and the control unit board 100, the latter may be used to activate and control the servos in the robot.

The control unit 100 may include a 32-bit low power processor, a 3.3v LDO voltage regulator, 1 MB memory, input/output (I/O), a Micro USB Connector with a USB to UART Bridge, and 802.11 b/g/n Wireless networking with an antenna. The processor may execute code uploaded to and stored in the memory to initiate, activate, and control the robot. The memory may be nonvolatile memory, such as firmware, EEPROM flash, or the like. Volatile memory such as RAM (e.g. DRAM) may also be included in the control unit board 100 for use in storing the initiating, activating, and/or run code.

The electronic module may be flashed with code or programs (or otherwise the code or programs may be stored in a memory on the module or remotely stored in the Cloud or on a server). The code is available to be executed by a processor on the module or located elsewhere in the cloud or as part of a remote server, which is electrically or electronically connected or coupled (i.e., by wire, bus(es), USB, wirelessly, or the like) to the servos, for converting the commands the processor receives from the RC App to activate or control the robot servos or RGB LEDs, which may also be included as part of the robot. In certain embodiments, the user may not update or upgrade the code, as the processor only runs with the code provided with or to it, and in certain other embodiments, the user or a technician or service person may update or upgrade the code.

The robot also includes a power source, which, for example, may be a rechargeable battery(ies) or pack or a non-rechargeable battery(ies) or pack, which may be stored in a torso of the robot, as will be described below. Using an I/O of the control unit 100, the robot may be electrically or electronically connected or coupled to drive the RGB LEDs, servos, and other components or structures, some of which may be optional, such as dual-axis gear reducer motors, that may be used for robot locomotion, for example, either by rotating wheels or by controlling gears that make the legs walk, or both.

Referring now to FIG. 1, the control unit board 100 (for example, a PCB) may be a special purpose and dedicated programmable unit that is programmed to initialize, activate, and control the Robot. In accordance with embodiments of the invention, the control unit board 100 may include active and passive components thereon, for example, a 32-bit low-power microprocessor or processor 101, 3.3v LDO voltage regulator 102, 1 MB memory 103, input/output (I/O) 104, Micro USB Connector 105 with USB-to-UART Bridge 106, and 802.11 b/g/n Wireless networking chip 107 with Antenna 108. Exemplary boards for the control unit board 100, such as manufactured PCBs that include an ESP82 microprocessor, may be an ESP8266 NodeMcu LUA CP2102 board, an ESP8266 Serial WIFI Module, or an HiLetgo ESP8266 NodeMCU LUA CP2102 ESP-12E board, or any similar manufactured board. Alternatively, the control unit board 100 may be a practice, prototype, or test board, such as the Photon board available from Particle Industries, Inc.

The control unit board 100 executes code uploaded to and stored in the memory 103 to initiate, activate, and control the robot. The memory 103 may be nonvolatile memory, such as firmware, PROM, EEPROM, flash, memristive, quantum, phase change, or the like for use in storing the initiating, activating, and or running code described herein. Volatile memory such as RAM (e.g. DRAM) may also be included as well or instead in the control unit for use in storing the initiating, activating, and or running code, in which case, for example, the code may be downloaded or stored in the volatile memory from a remote network.

FIGS. 2A-E and 3A-D illustrate an outer magnetic connector 200 and an inner magnetic connector 300, respectively, in accordance with embodiments of the invention. These magnetic connectors may be used to securely connect to thin materials, for example, materials of 0.5 mm to 3.0 mm thickness inclusive (e.g., with ±0.05 mm tolerance), such as chipboard, for use in assembling and enabling animation and motion of various components or structures of the robots described herein. Such connectors may provide sufficiently firm, secure, and lightweight connections or couplings between servos and the thin materials for successfully animating the robots while retaining their structural integrity compared to other possible types of connectors and materials.

The outer connector 200 and the inner connector 300 are formed of respective bodies that may be constructed or made of a light-weight material, such as plastic or chipboard. The body of the outer magnetic connector 200 may include or receive two small magnets 201 (a pair or set of magnets) inserted into or otherwise affixed to the body (e.g., glued) as part of the structure of the outer connector 200. One magnet is disposed at or toward one end of the outer magnetic connector 200 and the other magnet is disposed at or toward the other end of the outer connector 200, as shown in FIGS. 2A-E. The body of the inner magnetic connector 300 also may include or receive two small magnets 301 (another pair or set of magnets) similarly inserted into or otherwise affixed to the inner connector 300 as part of its structure, with one magnet disposed at or toward one end of the inner magnetic connector 300 and the other magnet disposed at or toward the other end of the inner connector 300, as shown in FIG. 3A-D. The sets of magnets of the outer connector 200 are complementary to the set of magnets of the inner connector 300 in terms of magnetic attraction, as explained herein.

Figure 4A:
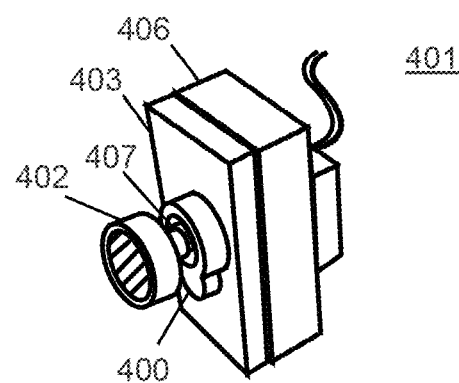
FIGS. 4A and 4B illustrates an inner connector and an outer connector, enclosing a servo and the generally less-sturdy (or pliable) thin material or structure in a perspective view (FIG. 4A), and in an exploded perspective view (FIG. 4B), in accordance with embodiments of the invention.
Figure 4B:
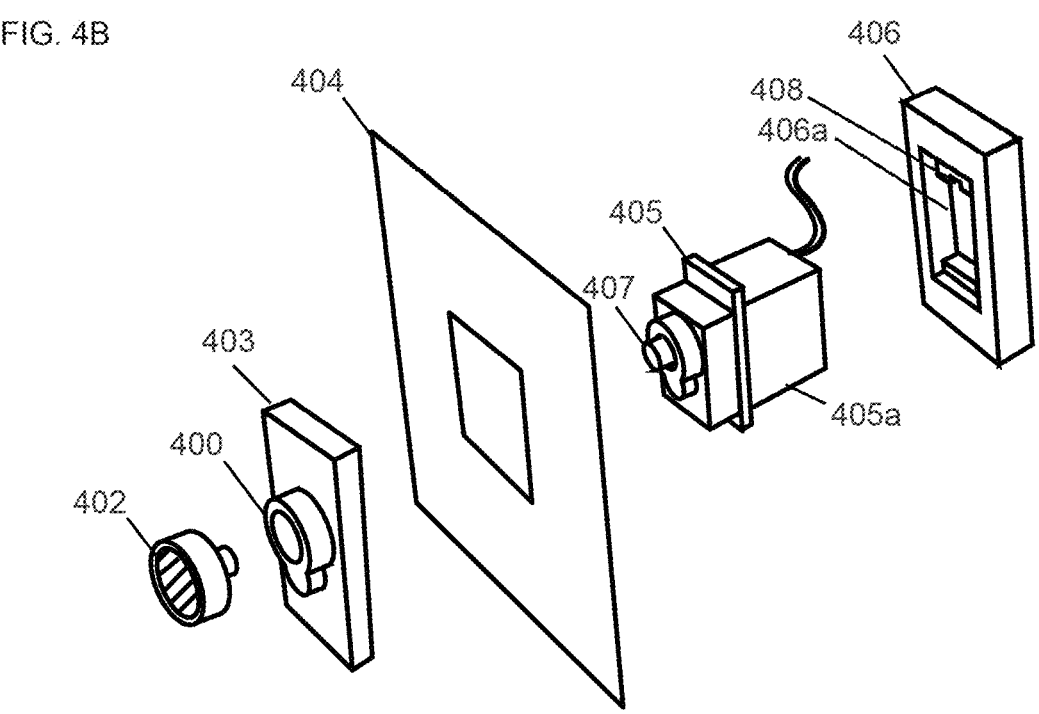

The outer magnetic connector 200 and the inner magnetic connector 300 may be used to hold a servo 405 (FIGS. 4A and 4B; shown in more detail in FIGS. 10A and 10B) to the generally less sturdy (or pliable) thin materials, as described already, such as chipboard, card stock, cardboard, or the like (hereinafter, referred to as chipboard), used to construct the robot. For example, as shown in FIG. 4A, a rotator arm 407 of the servo 405 may be inserted through an opening in thin material 404 (e.g., chipboard) and enclosed by an arm cover or arm cover apparatus 202 (FIGS. 2A-2E), 400 of the outer connector 200 (FIGS. 2A-2E), 403 that allows the rotator arm 407 to connect to a rotating magnetic apparatus 402. The outer connector 403 may be positioned to surround a portion of a housing 405a of the servo 405 (i.e., a "front" portion of the servo 405 away from its wires), as shown in FIGS. 4A and 4B, and allows a rotating arm (or rotator) 407 of the servo 405 to stick out of the outer magnetic connector 403. The inner magnetic connector 300 (FIGS. 3A-3D), 406 will surround another portion of the housing 405a of the servo 405 (i.e., a "back" portion of the servo 405 toward its wires), as shown in FIGS. 4A and 4B, and provide an opening 302a having access opening 302, 408 for the wires of the servo 200 (FIGS. 3A-3D and 4A-4B) and the rotating arm 407. The rotator arm 407 protrudes out from the aforementioned thin material 404 (502 in FIGS. 5A and 5B) for enabling such animation and motion, as will be described further below. As shown in the exploded view in FIG. 4B, an inner magnetic connector 406 (same as the inner magnetic connector 300) has an opening 406a (302a in FIG. 3B) that fits over the servo 405 and its wires. The servo 405 (and the other servos described herein) typically are direct current (DC) servos having wires for ground, power, and signals/control. The servo 405 may be inserted through an opening in a generally less-sturdy (or pliable) thin material 404, which could be chipboard, cardboard, cardstock, thin metal or plastic, or the like. The outer portions of the inner magnetic connector 406 extend beyond the edges of the opening in the material 404. An outer magnetic connector 403 (same as the outer magnetic connector 200) includes an opening that accepts a portion of the servo 405, which includes the rotator arm 407, that extends through the material 404. The outer magnetic connector 403 (same as the outer magnetic connector 200) and the inner magnetic connector 406, in this manner, serve to secure and sandwich the servo 405 and the material 404 between them through magnetic attraction. A magnetic rotating connector 402 then is secured to and encloses the rotator arm 407 of the servo 405, as shown in FIGS. 4A and 4B (FIG. 4A does not show the thin material 404, which would be sandwiched, as schematically shown in the exploded view of FIG. 4B). The components and connectors described above, because of the mutual attraction of the magnets (i.e., due to the magnetic polarities of the magnets of the inner and outer magnetic connectors being complementary), may be used for securely connecting, in constructing or assembling the robots, the servos and the chipboard materials that enable animation and motion of the various components and structures of the robots.

Figure 5A:
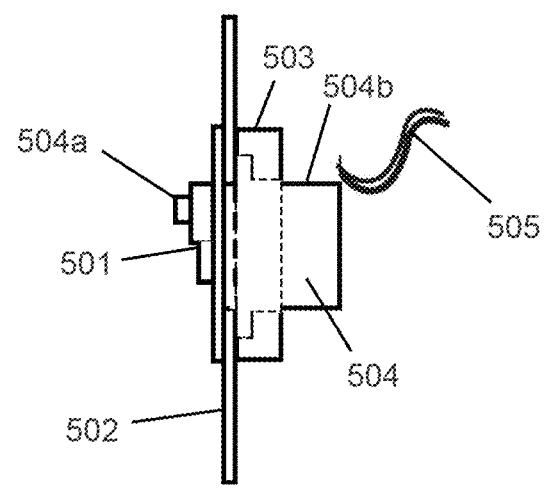
FIGS. 5A and 5B illustrate, a side view of the inner connector and the outer connector, enclosing a servo and a generally less-sturdy (or pliable) thin material or structure in a side view (FIG. 5A), and in an exploded side view (FIG. 5B), in accordance with embodiments of the invention.
Figure 5B:
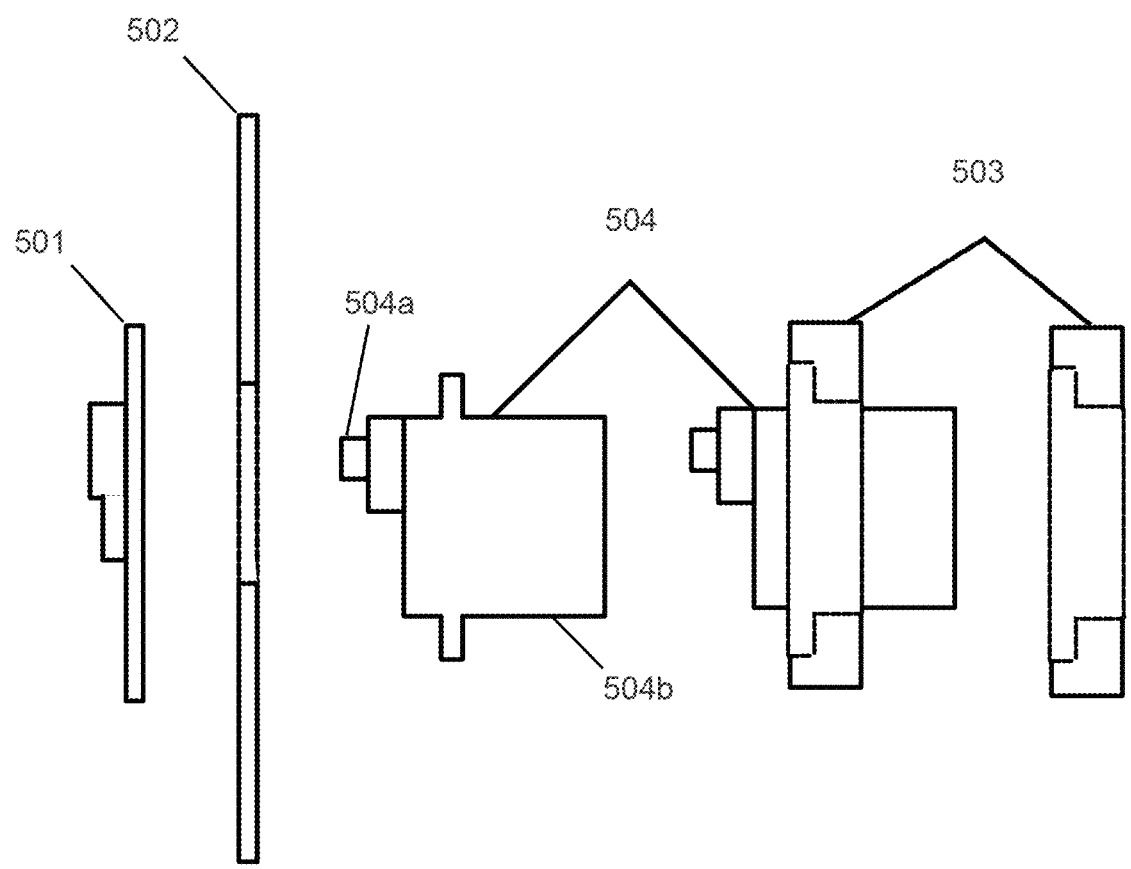
Figure 28A:
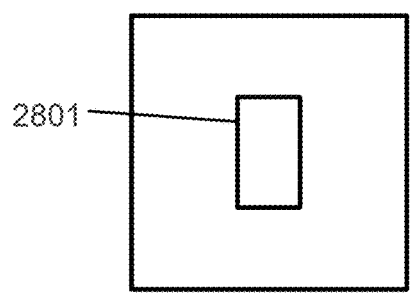
FIGS. 28A (plan view), 28B (perspective view), 28C (perspective view), 28D (plan view), 28E (perspective view), 28F (perspective view), 28G (plan view), 28H (perspective view), and 28I (perspective view) illustrate chip-boards having openings and their respective corresponding various connector embodiments disclosed herein, in accordance with embodiments of the invention.
Figure 28B:
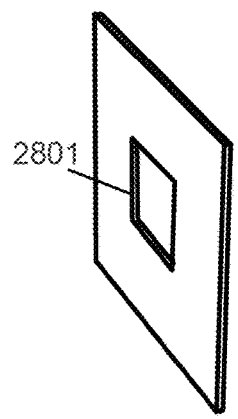
Figure 28C:
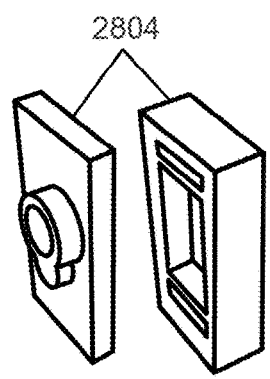
Figure 28D:
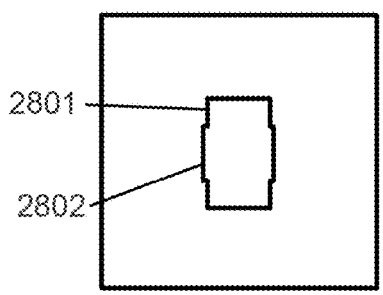
Figure 28E:
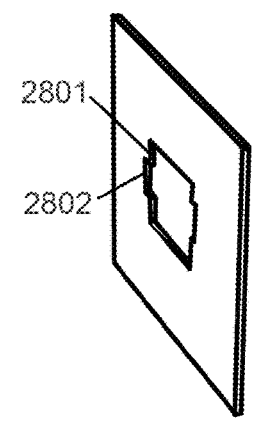
Figure 28F:
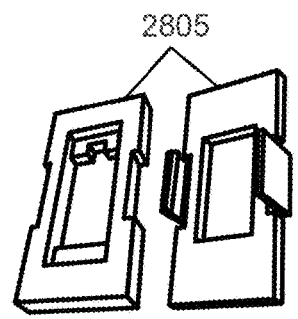
Figure 28G:
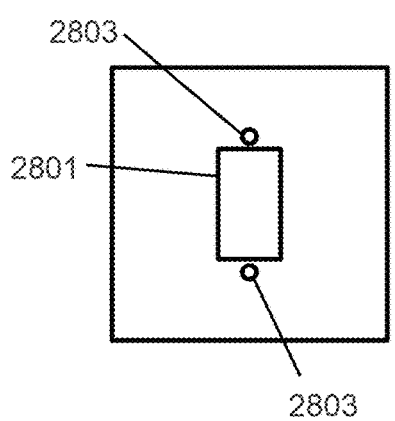
Figure 28H:
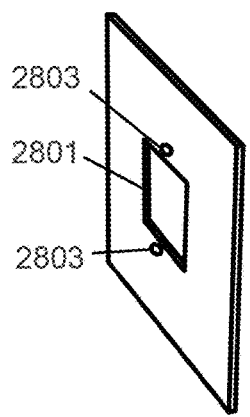
Figure 28I:
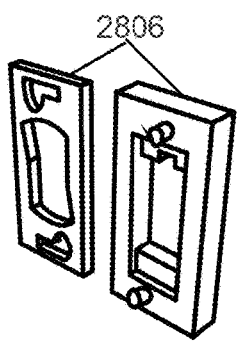

In accordance with embodiments of the invention, FIGS. 5A and 5B illustrate cross sectional (FIG. 5A) and an exploded side view (FIG. 5B) of an inner clip connector 503 (806 in FIGS. 8B, 8D, and 8F) and an outer clip connector 501 (8036 in FIGS. 8A, 8C, and 8E) that may be used to secure a housing 504b of an inserted servo 504 (same as the servo 200) with its wires 505 accessible from a back side of the inner clip connector 503 (i.e., from a right side of the connector 503, as shown FIG. 5A). The servo 504 with its rotating arm 504a may be inserted through a material 502 (same as the material 404). The rotating arm 504a of the servo 504 may be accessible at a front end of an outer clip connector 501 (i.e., from a left side of the connector 501, as shown in FIG. 5A) through an opening in the outer clip connector 501. The outer clip connector 501 may connect to the inner clip connector 503 and serve to sandwich the servo 504 and the material 502 with the rotating arm 504a of the servo 504 extending through the opening in the material 502 in the manner depicted in FIG. 5A. The inner clip connector 503 and the outer clip connector 501 will thereby mechanically secure the servo 504 through the material 502 using mating clip portions of the inner clip connector 503 that clip to corresponding and complementary mating clip portions of the outer clip connector 501, as shown in and will be described with respect to FIGS. 8A-8F. These mating clip portions, which are illustrated in FIGS. 28A-28C, also pass through corresponding openings in the material 502 similar to what is shown in FIG. 4B. The dimensions of these chipboard openings allow the rotor (see rotor 10 in FIGS. 10A and 10B) to pass therethrough. The major exemplary dimensions of these openings (see FIG. 28) may be approximately 22.7 mm long by 12.0 mnm wide inclusive (with approximately meaning ±0.1 mm).

Figure 6A:
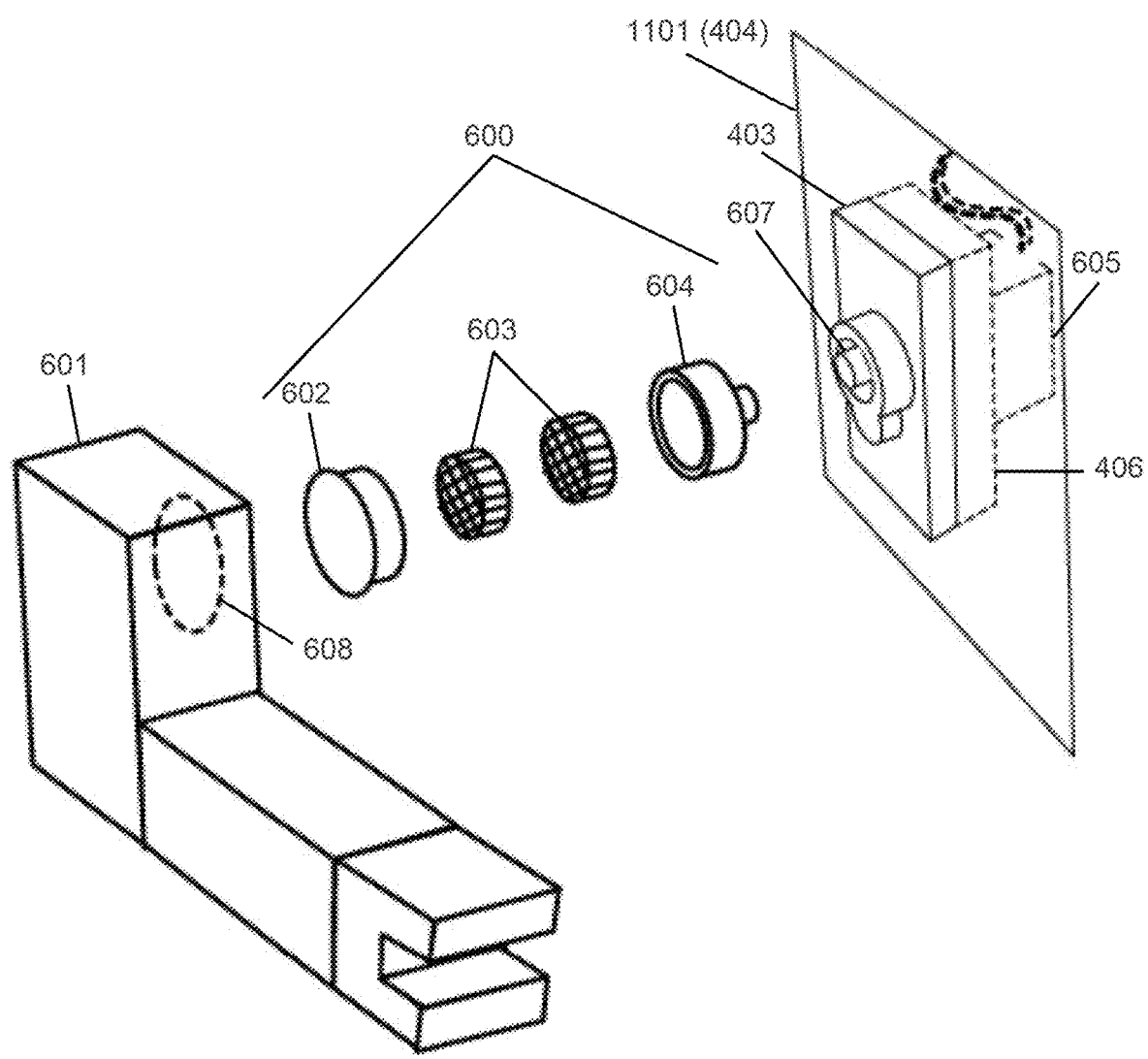
FIGS. 6A and 6B illustrate an appendage connector, in exploded perspective views, in accordance with embodiments of the invention.
Figure 6B:
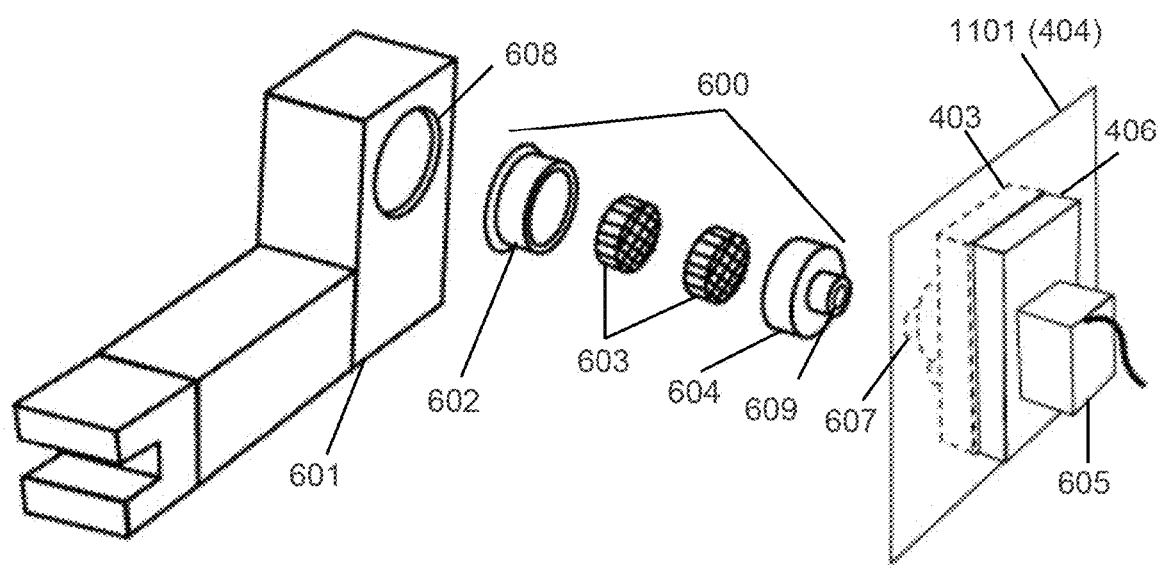

In accordance with embodiments of the invention, referring to FIGS. 6A and 6B, an appendage connector 600 is illustrated in exploded, perspective views for connecting or coupling an appendage 601 (e.g., an arm) of the robot to a servo 605 (e.g., the same as the servos described herein). The appendage 601 may be constructed of the same generally less sturdy (or pliable) thin materials described above, such as chipboard. The appendage connector 600 includes radial containers or connectors 602 (second container) and 604 (first container), for example, constructed of plastic, chipboard, or cardboard, each for accepting a magnet 603 for allowing the appendage 601 to be coupled to a robot torso (1101 in FIG. 11 made out of the thin material 404) via coupling to the servo 605 The magnets 603 may be glued or otherwise attached to or within the connectors 602 and 604. The appendage 601 connects, couples, or attached to the container 602 containing one of the magnets 603 via a hole or opening 608 in the appendage 601 for inserting the container 602 (or a portion thereof). The container 602 may be connected, coupled, or attached to the appendage 601 (or inside the appendage 601) by gluing it at or within the opening 608 in the appendage 601. The servo 605 connects or couples to the container 604 containing another of the magnets 603. An opening (e.g., a fitted opening) 609 (FIG. 6B) in an extension of the radial magnetic container 604 may slip over (which, in certain embodiments may snugly or sufficiently tightly fit over) a rotator arm 607 of the servo 605. The magnets 603 are attached to or positioned within their respective containers 602 and 604 such that their polarities will attract each magnet 603 to the other. The attraction of the two magnets 603 to each other or keeps holds these components of the connector 600 together. The material of the robot torso 1101 (or 502 in FIGS. 5A and 5B) may be "sandwiched" between the inner 406 and outer 403 connectors (or between the other inner and outer connector embodiments disclosed herein, such as shown in FIG. 4B), for holding or securing the appendage 601 to the servo 605 and the robot torso. Such sandwiching, as described herein, may hold the torso 1101 between the two connectors 403 and 406) such that the servo 605, torso 1101, appendage connector 600, and the appendage 601 are secured or held for imparting rotational motion on the appendage 601 when the servo 605 is activated. For the embodiments of FIGS. 6A and 6B, the weight load of the connector 600 and the appendage 601 is not so great that the two magnets 603 will slip with respect to each other when the servo 605 is activated.

Figure 7A:
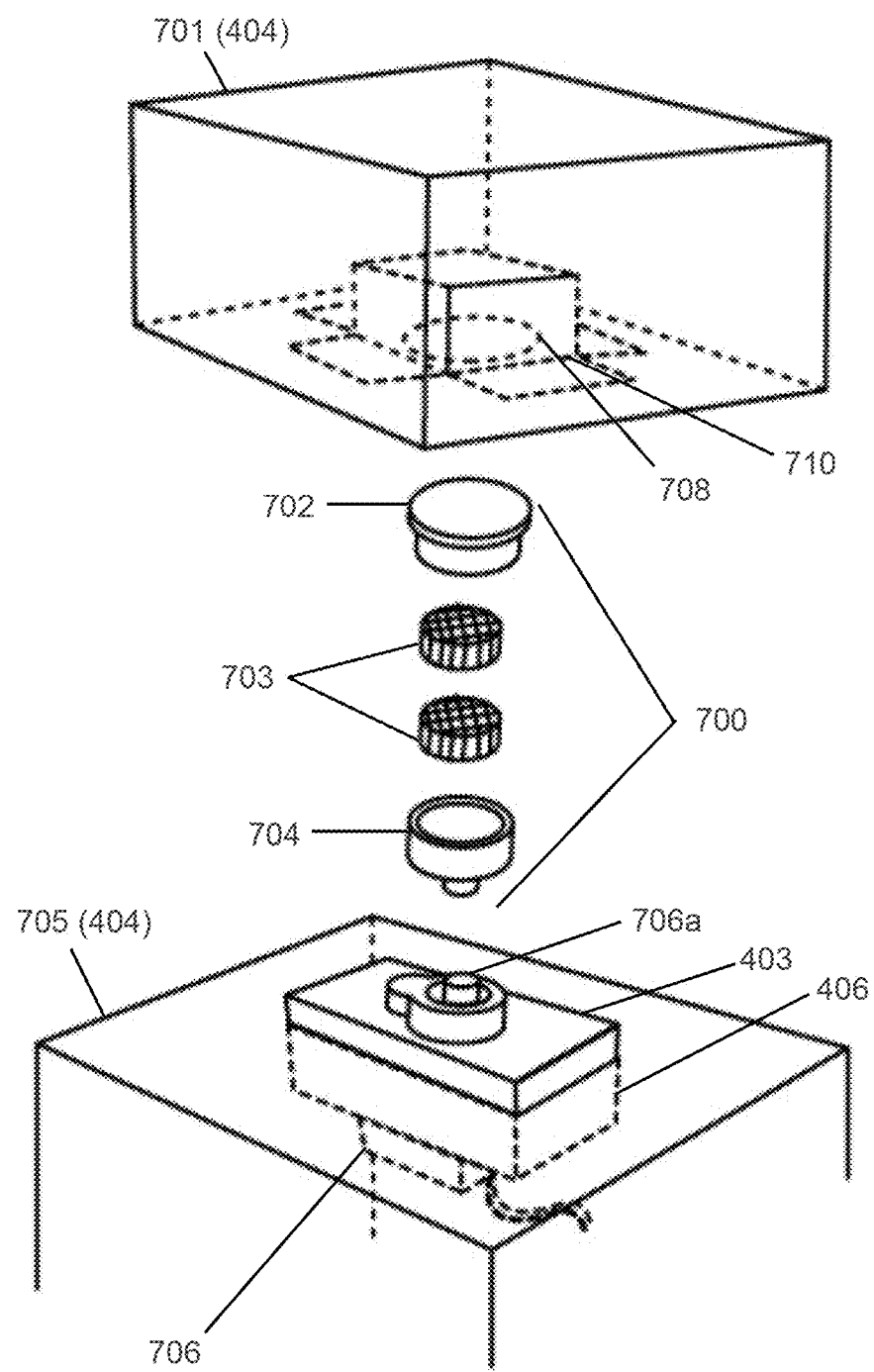

In accordance with embodiments of the invention, referring to FIGS. 7A and 7B, a robot head appendage connector 700 is illustrated in an exploded, perspective view for connecting or coupling a head 701 of the robot to a servo 706 (e.g., the same as the servos described herein). The head appendage connector 700 and other structures shown in FIGS. 7A and 7B are similar to or the same as those described above and shown for the appendage connector 600 in FIGS. 6A and 6B. The appendage connector 700 includes radial magnetic connectors or containers 702 and 704, for example, constructed of plastic, chipboard, cardboard, etc., each for containing, inserting, accepting, or attaching (e.g., glued) a magnet 703. The radial magnetic container 702 connects, couples, or attaches to or within a head appendage 701 (e.g., also made out of the thin material 404) through a hole or opening 708 in the bottom of the head. A supporting structure 710, which may also be made out of the thin material 404, may be included as part of the head appendage 701. The supporting structure 710 may be glued or otherwise attached within or inside the head appendage 701 at the bottom thereof. The container 702 may be connected, coupled, or attached to the head appendage 701 (or inside the head appendage 701) by gluing it at or within the opening 708 in the head appendage 701. An opening (e.g., a fitted opening) 709 (FIG. 7B) in an extension of the radial magnetic connector 704 may slip over or sufficiently tightly fit over a rotator arm 706a (FIG. 7A) of the servo 706. The attraction of the magnets 703 couples or holds the containers 702 and 704 together. A robot torso 705 (like the torso 1101 or 502), which also may be made out of the thin material 404, may be sandwiched along with the servo 706 between the inner 406 and outer 403 connectors (or between any of the other inner and outer connectors described herein). Therefore, as similarly described above and shown for the appendage 601 in FIGS. 6A and 6B, the head appendage 701 may be connected, coupled, or attached for rotational motion when the servo 706 is activated. For the embodiments shown in FIGS. 7A and 7B, the weight load of the connector 700 and the head appendage 701 is not so great that the two magnets 703 will slip with respect to each other when the servo 705 is activated.

Figure 8A:
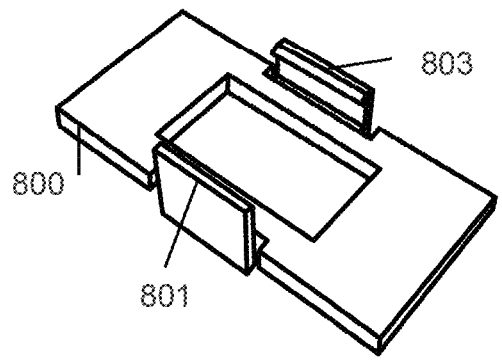
FIGS. 8A (perspective outside view), 8B (perspective inside view), 8C (outside view), 8D (inside view), 8E (short side view), and 8F (outside view) illustrate an outer clip connector (FIGS. 8A, 8C, and 8E) and an inner clip connector (FIGS. 8B, 8D, and 8F), respectively, in accordance with embodiments of the invention.
Figure 8B:
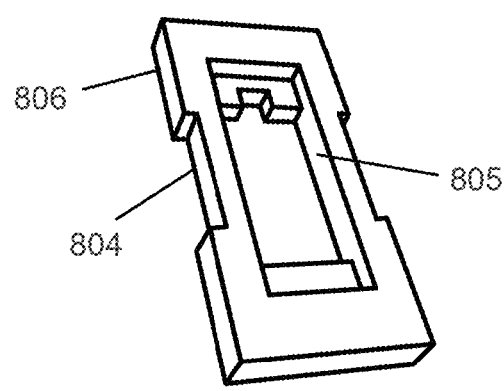
Figure 8C:
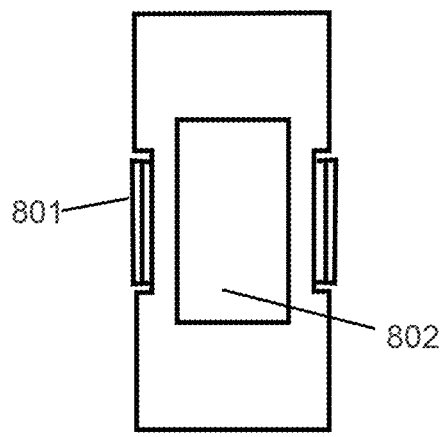
Figure 8D:
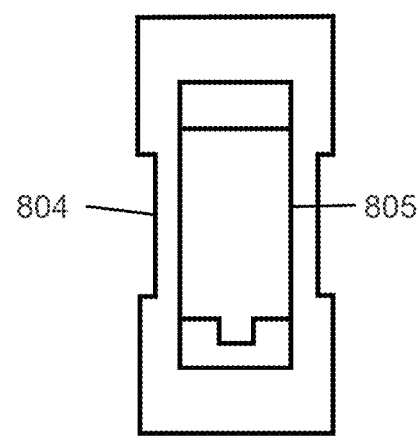
Figure 8E:
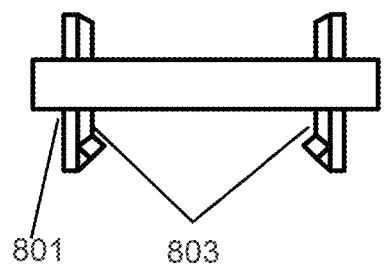
Figure 8F:
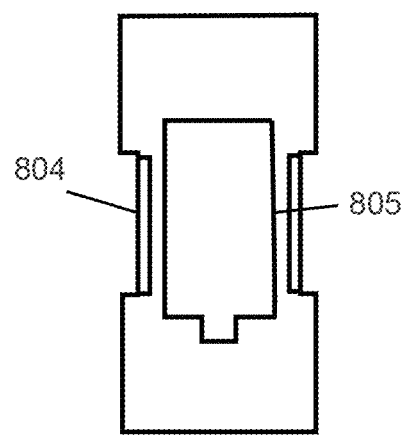
Figure 9A:
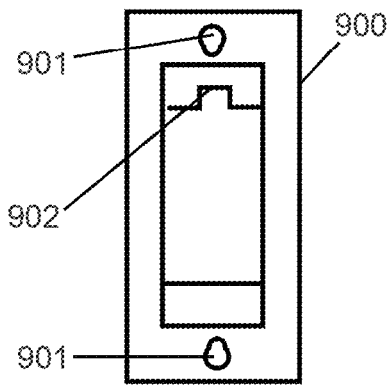
FIGS. 9A (inner inside view), 9B (outer inside view), 9C (outer outside view), 9D (inner outside view), 9E (inner inside perspective view), 9F (outer inside perspective view), illustrate an inner (FIGS. 9A, 9D, and 9E) and outer (FIGS. 9B, 9C, and 9F) lock (or locking) connector, respectively, in accordance with embodiments of the invention.
Figure 9B:
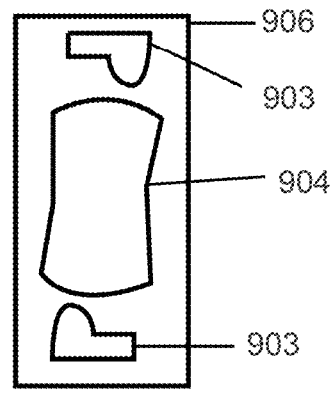
Figure 9C:
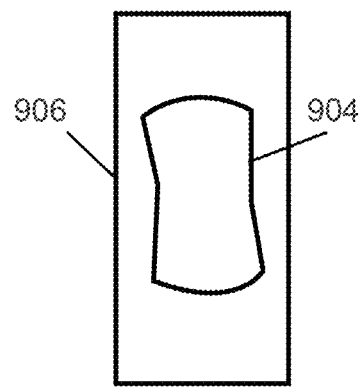
Figure 9D:
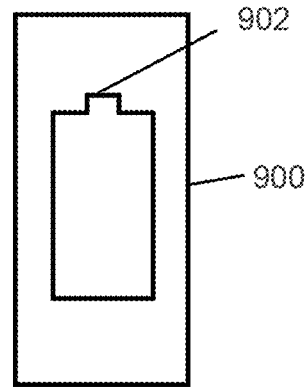
Figure 9E:
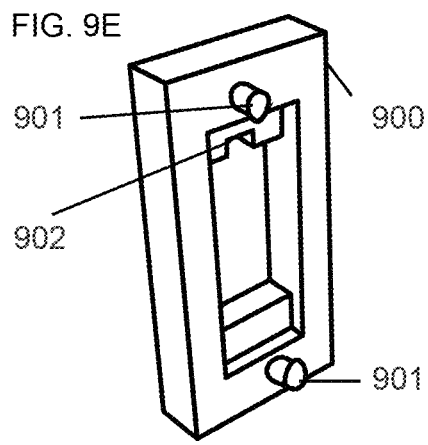
Figure 9F:
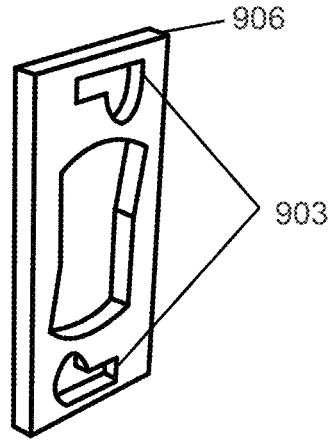

FIGS. 8A, 8C, and 8E illustrate an inner clip (or clipping) connector 800 and FIGS. 8B, 8D, and 8F illustrates an outer clip (or clipping) connector 806, respectively, FIGS. 8B, 8D, and 8F correspond and are complementary to the inner clip connector 800 of FIGS. 8A, 8C, and 8E, in accordance with embodiments of the invention. These outer and inner clip connectors 800, 806 represent possible alternative embodiments to the magnetic connectors 200, 300, but which function similarly thereto. These outer and inner connectors 800, 806 connect together using respective clips 801 and 803. The outer clip connector 800 may have two clips 801 with clipping wedges 803. A servo, such as those described above, may be inserted through connector servo windows 802, 805 in the inner and outer clip connectors 800, 806, respectively, similar to what was described above. The inner clip connector 806 has two notches 804 for accepting the clips 801 and wedges 803 for making secure and biased connections therebetween. With the servo thus inserted, the outer clip connector clips 801 may be snapped over the notches 804 using the wedges 803 for this purpose to secure the generally less-sturdy (or pliable) thin chipboard material described above.

FIGS. 9A, 9D, and 9E and FIGS. 9B, 9C, and 9F illustrates inner and outer lock or locking connectors 900, 906, respectively, in accordance with embodiments of the invention. The inner and outer locking connectors 900, 906 are possible alternative embodiments to the magnetic connectors 200, 300 described above, as are the clipping connector embodiments shown in FIGS. 8A-8F. The inner and outer locking connectors 900, 906 may connect together using two prongs 901 that are passed through two prong holes 903 in the outer locking connector 906. To secure a servo, such as those described above, between the inner and outer locking connectors, 900, 906, the servo may be inserted through a locking connector servo window or opening 902 in the inner locking connector 900, similar to what is described above. The servo arm end of the servo may be passed through a window or opening 904 in the outer locking connecter 906 to be encompassed therein. In doing so, due to the structure and shape of the window or opening 904 in the outer lock connector 906, as shown at the top right of FIG. 9B the outer locking connector 906 may be slid at an angle over the servo arm end of the servo so that the two prongs 901 of the inner locking connector 900 will be inserted into the corresponding and shaped prong holes 903 of the outer locking connector 906. The outer locking connector 906 then may be rotated at a small angle, such as between and including 5-25 degrees, depending on the design and needs of the locking connectors 900, 906, and then turned or rotated to move the prongs 901 into smaller window or opening regions of the window or openings 903 to provide a secure connection for the servo to the generally less-sturdy (or pliable) thin chipboard material or structures described above. As would be understood by one of ordinary skill in the art, the prongs 901 and the prong holes 903 thus act as lock and key-type mechanisms.

Figure 10A:
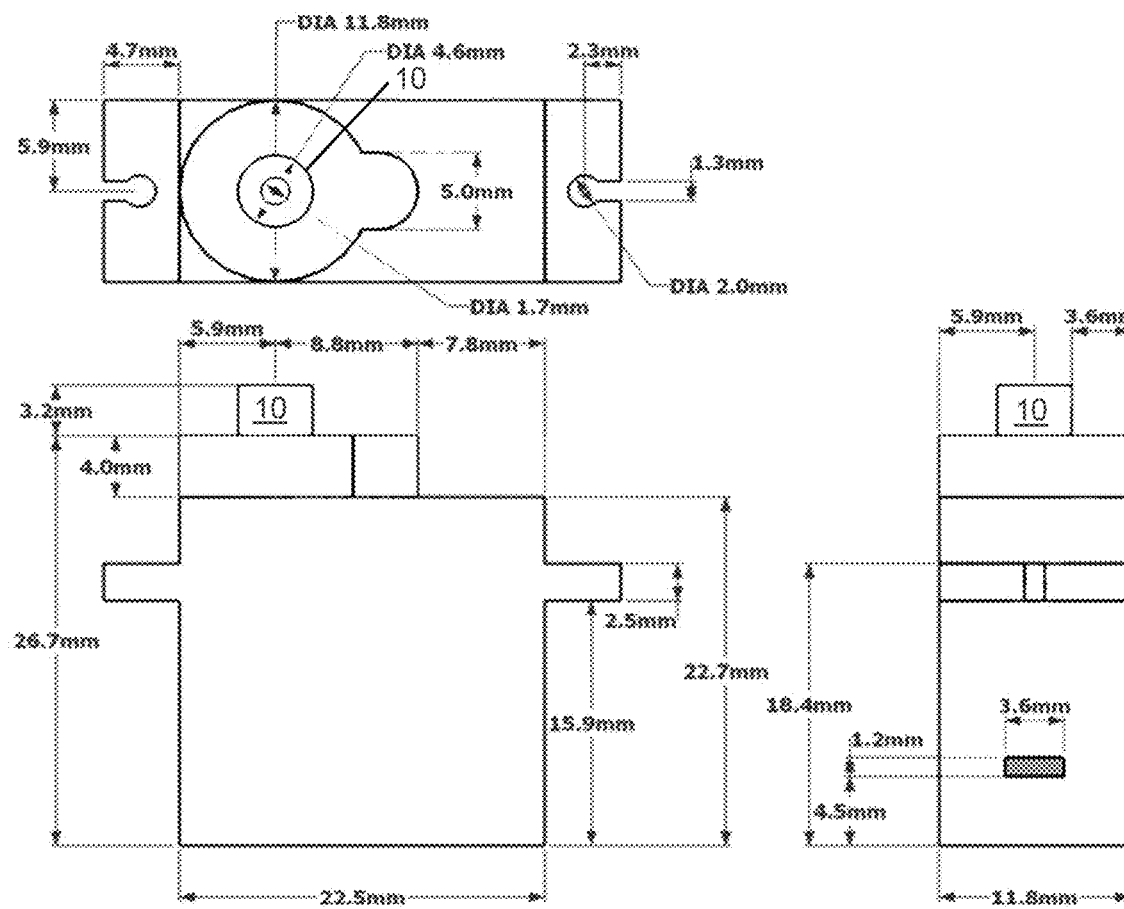
FIGS. 10A and 10B illustrates a prior art basic micro servo, schematically in side and end views (FIG. 10A) and in a perspective view (FIG. 10B).
Figure 10B:
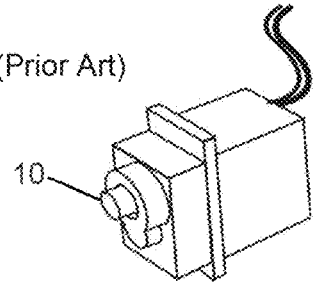

A servo or servomotor is a rotary actuator or linear actuator that allows for precise control of angular or linear position, velocity and acceleration. It includes a suitable motor coupled to a sensor for providing positional feedback to a computer, controller, or handheld device, such as a smartphone, or a control unit, such as that shown in FIG. 1. Servos may be used in applications, such as robotics, CNC machinery or automated manufacturing. FIGS. 10A and 10B illustrate a prior art standard mini or micro servo, schematically in side and end views (FIG. 10A) and in a perspective view (FIG. 10B), that may be used as any of the servos for use with the robots described herein. These servos may be connected or coupled to the robots for imparting the motion described herein using any of the connectors described above, as appropriate. An exemplary servo may be a Ybee SG90 Micro Servo Motor Mini SG90 9g.

Figure 11:
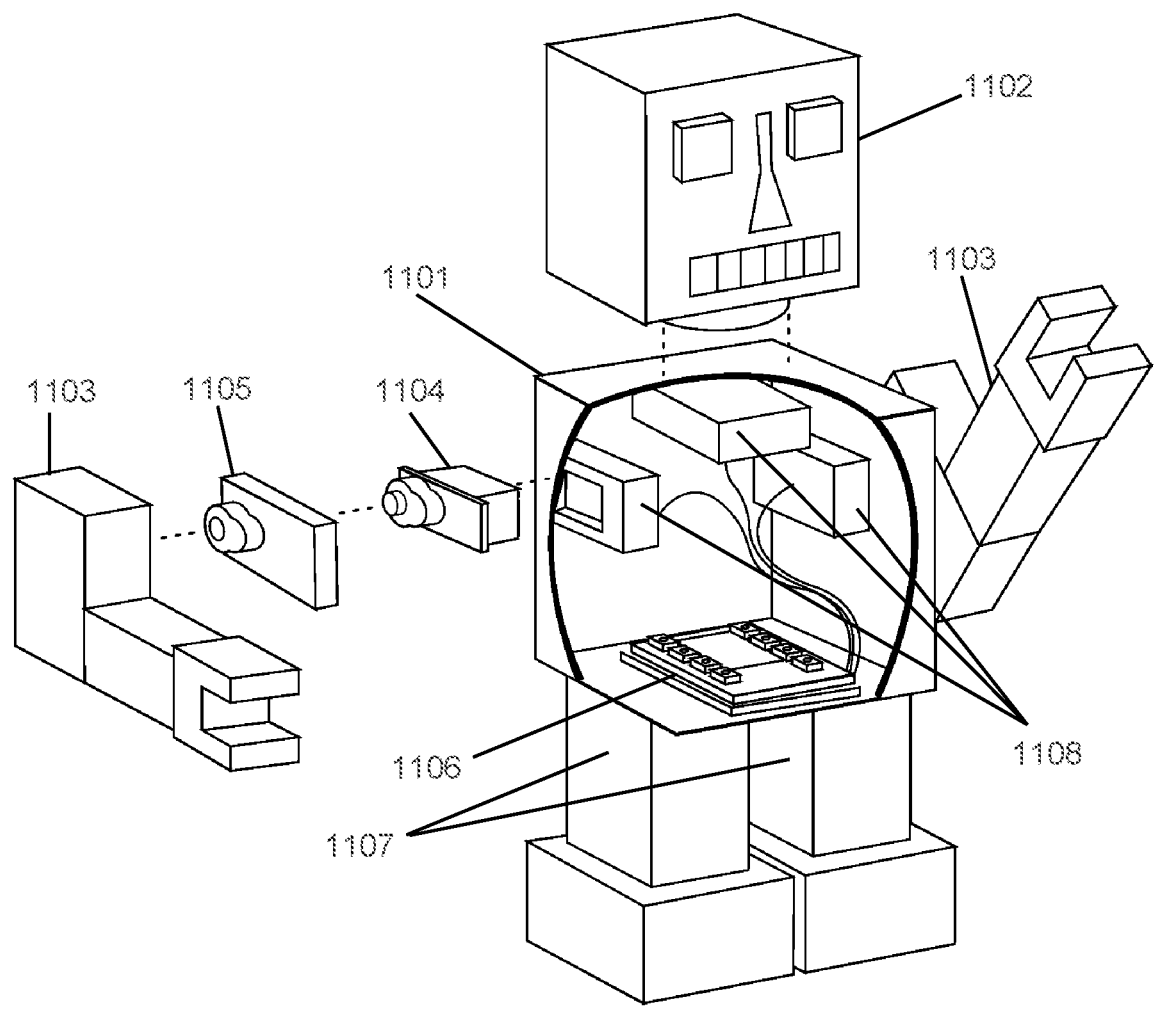
FIG. 11 illustrates the overall assembly of the robot, connectors, and servos, and the placement of the custom controller board, in accordance with embodiments of the invention.

In accordance with embodiments of the invention, referring to FIG. 11, a robot is illustrated that uses, as components, the inner and outer connectors 300, 200, respectively, or the other inner and outer connector embodiments, and the servos described above. The particular components chosen to be used to build the robot may depend on what types of connectors the user decides they want or which connectors are available to the user. There may be other reasons for choosing the particular connectors to be used, including, but not limited to, manufacturing costs. FIG. 11 shows the inner and outer connectors for appendage and head mounting. A control unit board 1106, such as the control unit board 100 shown in FIG. 1, and the power source or supply may be fixed or mounted at one or more locations inside the robot, which will be discussed further below with respect to FIG. 27, by suitable mounting and securing structures, such as by future designed connectors, lightweight screws, clamps, glue, or the like, within the torso 1101, as illustrated in FIG. 11, and may be electrically connected or coupled to all the servos included in the robot. The main body or torso 1101 may contain the servos encased within the inner and outer magnetic connectors 1107 like the connectors 200, 300 (which may instead be the other connector embodiments, such as the clipping connector or the locking connector embodiments described above, or combinations of any of these connectors that work together as described. The torso 1107 may also contain the power source, such as battery(ies) 109, 110 (shown in FIG. 1, but not shown in FIG. 11) for powering the robot (servos, LEDs, etc.) and the control unit board 100, including a processor 1106, for controlling the robot, such as the processor 101 shown in FIG. 1. Power from the power source may pass through a power input 113 (not shown in FIG. 11), which may include conductive power and ground wires/connectors from the power source to the control unit board 100 and its components. Power to the robot for the servos, LEDs, etc. may also pass this way through the control unit board to the servo wires 505 and through other wires (not shown) to the LEDs. A head 1102 of the robot may be connected to a top portion of the torso 1101 of the robot by inner (not shown in FIG. 11) and outer 1108 magnetic connectors like those described above. Leg appendages 1107 may be attached to a bottom portion of the torso 1101 using the same or similar appendage attachment connectors described above. Two arm appendages 1103 may also be attached to sides of the torso 1101 by inner 1108 and outer 1105 magnetic connectors like those described above. Each of the head 1102, torso 1101, arm appendages 1103, and leg appendages 1107 are robot body parts. As shown in the exploded portion on the left side of FIG. 11, the inner connectors 1108 and outer connectors 1105 may enclose or encase servos 1104 as well as the chipboard of the torso 1101. The arm appendages 1103 may be attached and secured as described above. The other servos for the head 1102 and the leg appendages 1107 may also be attached as described above.

Figure 12:
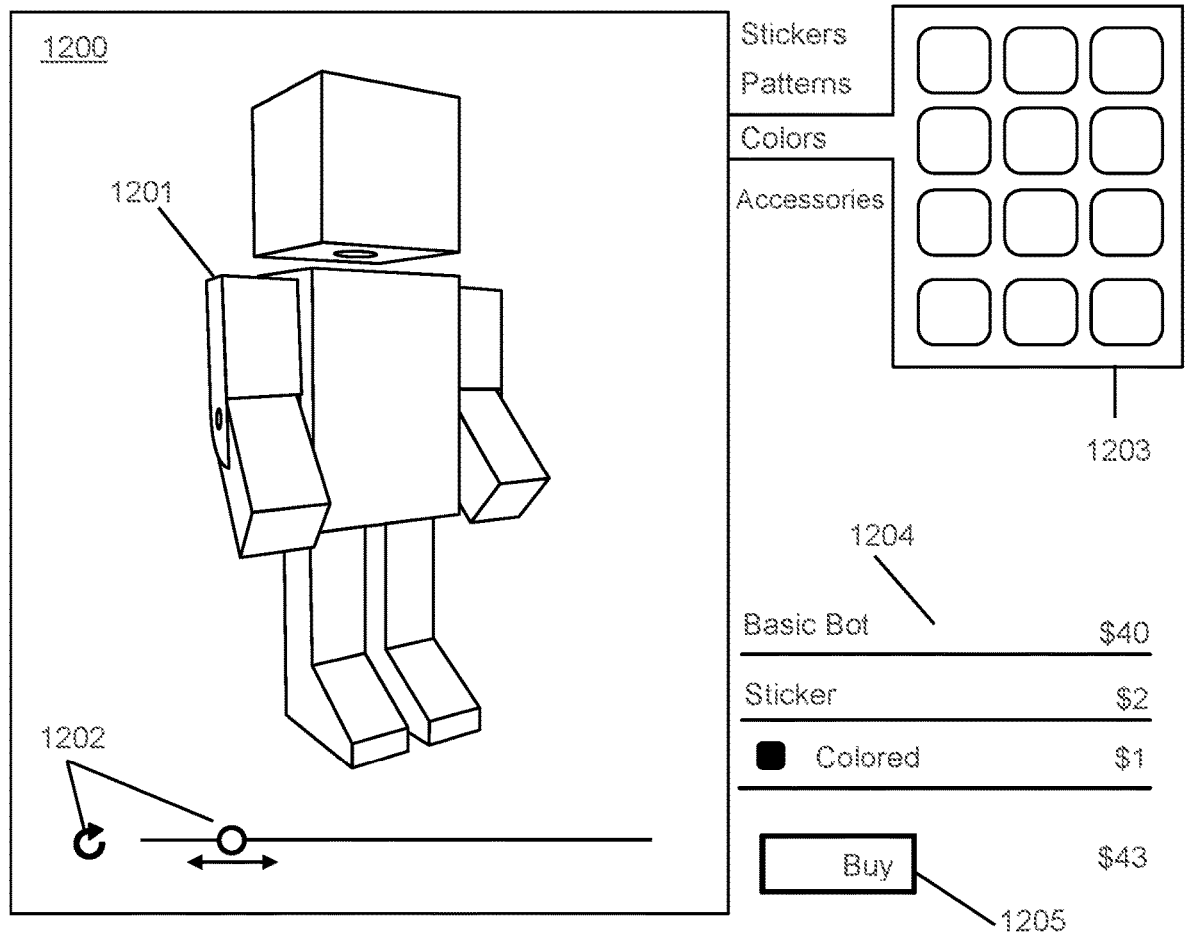
FIG. 12 illustrates a robot customization window used on a website to create a customized robot, in accordance with embodiments of the invention.

In accordance with embodiments of the invention, referring to FIG. 12 (also described further below with respect to FIGS. 25A and 25B), a robot "customization window" 1200 on a website, such as for display on a screen or display of a computer, handheld device, smartphone, or the like, is illustrated for designing, customizing, and/or ordering a robot by a user or customer. The user or customer may, for example, step through a viewing and customization process:

The process may flow to a 3D Customizer process 2507 (FIG. 25A) on the website so that the user or customer may view a 3D model of the chipboard robot, as shown in the customization window 1200 (FIG. 12). The user or customer may rotate 1202 a robot in the customization window 1201 through and including 360 degrees of rotation, for example, about a vertical axis in the plane of, or parallel to, the display.

The process may flow through a Build 2518 and Build options processes 2508, such that the user or customer may select various options, such as head type, leg type, torso type, or connector type, or the like.

The process may flow through a Design 2519 and Design options 2509 processes, such that the user or customer may select color, patterns, stickers, or the like to personalize the robot and apply or swap-in 1203 them to the depicted robot image in the customization window.

The process may flow through an Accessories 2520 and Accessories options 2510 processes, such that the user or customer may select and apply or swap-in 1203 various accessories, such as antenna, armor, different heads, or the like.

The process may flow through an Upgrade 2521 and Upgrade options 2511 processes, such that the user or customer may elect to choose various upgrades, as Hardware, LEDs, Sensors, or the like.

As the user or customer adds their accessories, designs, other build options, upgrades, etc. to their robot in the customization window, a total robot cost 1204 may be displayed in real-time to the user or customer so there are no surprises when they buy or purchase 1205 their robot at checkout.

When the user or customer is finished adding their accessories, designs, other build options, upgrades, etc. and completed customization, the process may flow through an Add Robot to Cart process 2512 that provides the associated total cost to a Shopping Cart process 2504, and the user or customer may be directed to checkout.

RC App Landing Page/RC App Launch Screen/RC App Loading Screen

Figure 14:
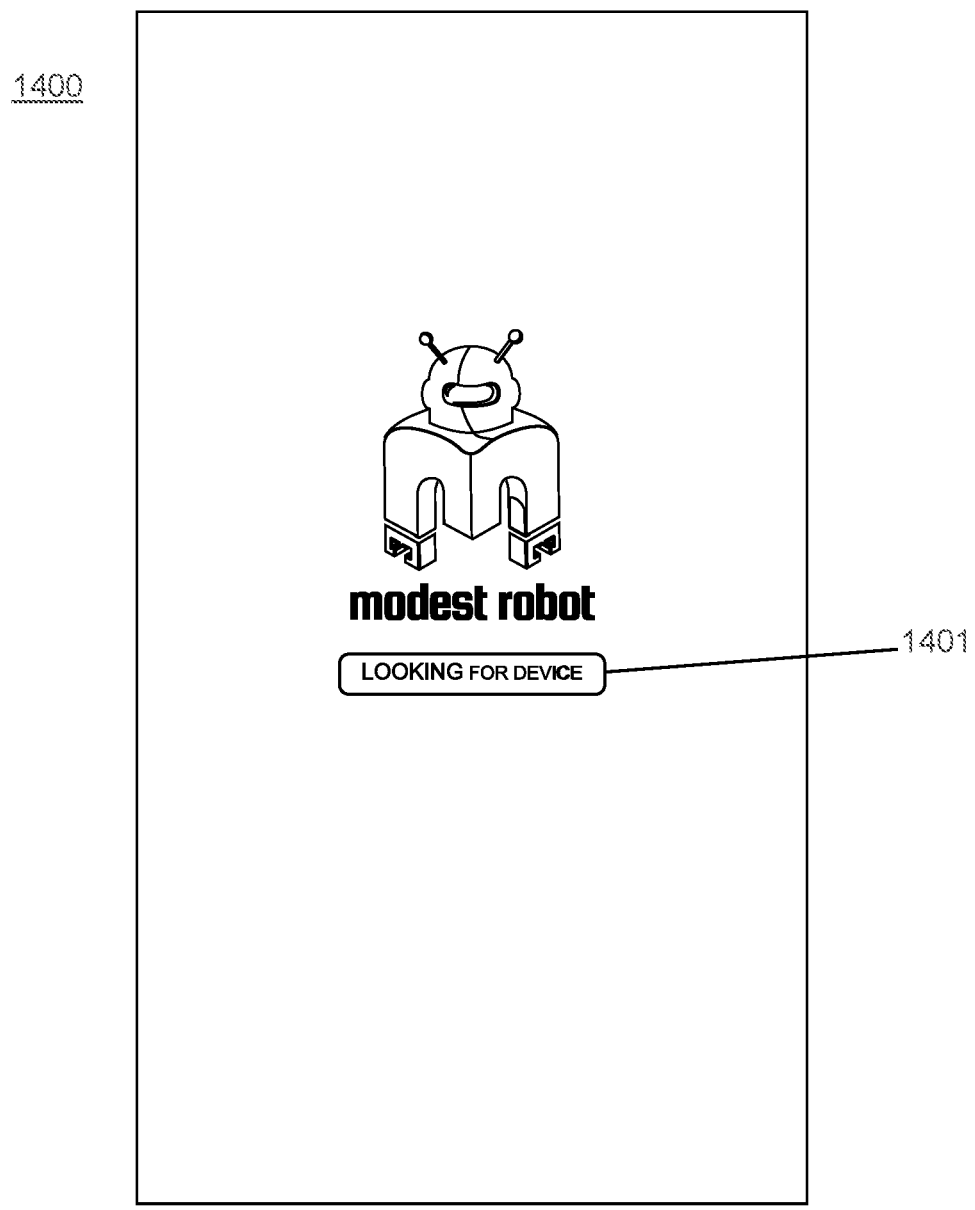
FIG. 14 illustrates a Robot Control App (or RC App) Landing Page, in accordance with embodiments of the invention.

An RC App Landing Page (launch screen), for example an RC App Landing Page shown as 1400 in FIG. 14, may be displayed when the user brings up the RC App first to load and run code stored in the memory 103 by execution on the processor 101 of the control unit board 100, 1106. The initial display may of a robot company logo or trademark, such as a "Modest Robot" logo, or other image, with a "looking for bots" or "looking for device") (i.e., a detecting) message 1401 displayed to the user as the RC App loads and runs. The RC App Landing Page 1400 may display all the robots the user or customer has already added using the RC App, as well as their connection status and strength. From here the user may access all other areas of the RC App, as described herein.

Figure 24A:
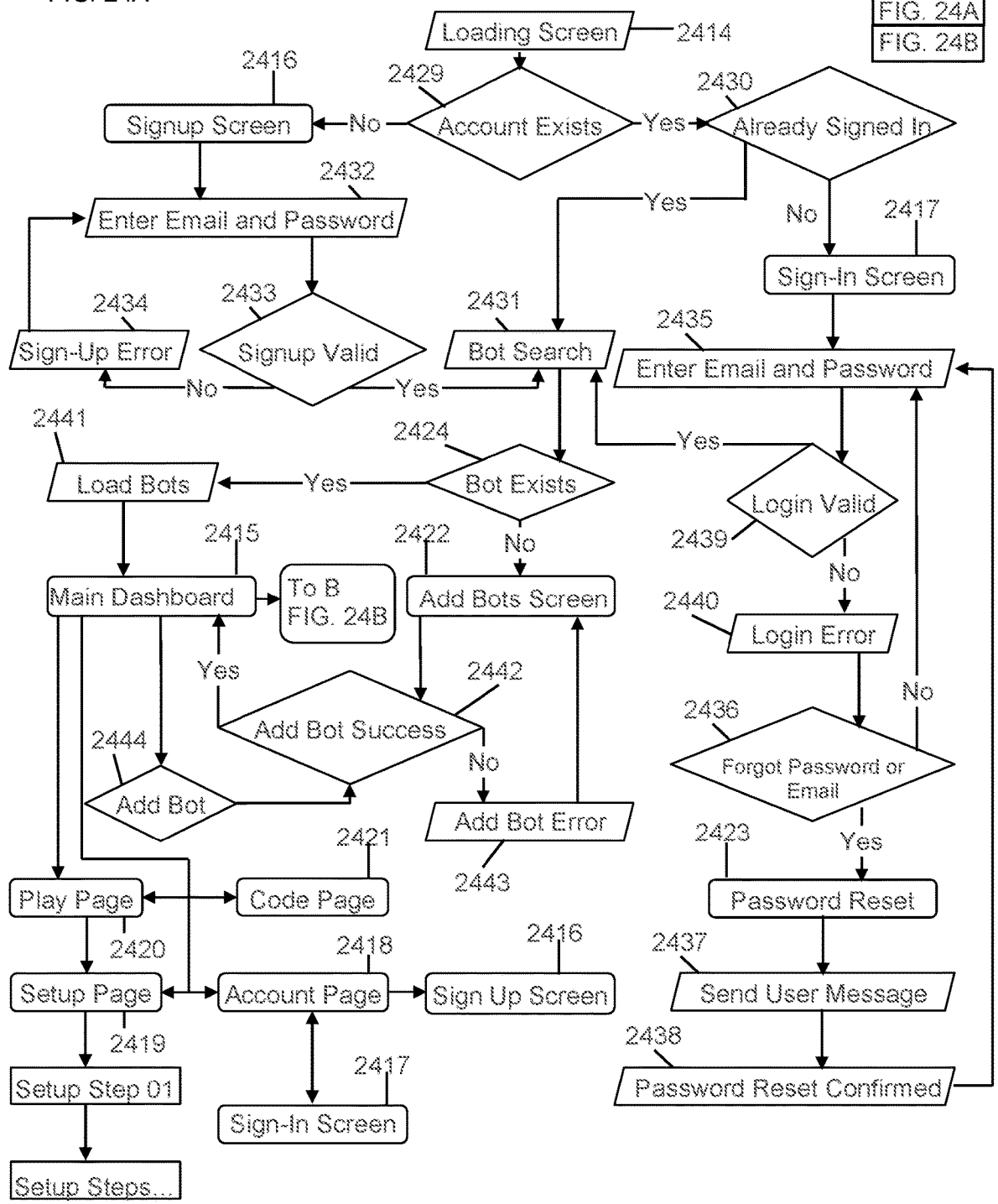
FIGS. 24A and 24B are a flowchart of the RC App, in accordance with embodiments of the invention.
Figure 24B:
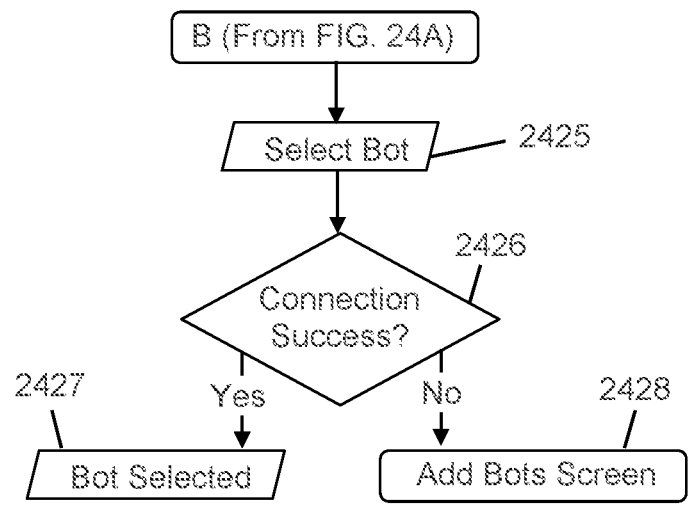

Referring to FIGS. 24A and 24B, a process or method flowchart of the RC App is illustrated. When initially started, the RC App will display a launch or loading screen 2414 like that shown in FIG. 14 and then look for an existing user account through an Account Exists process 2429. If no account exists, it will direct the user to an account sign-up page 2416, such as 1600 in FIG. 16 (described below), where they may enter their email address and a password 2432 to create an account. The RC App will then return a success or failure indicator in a Signup Valid process 2433. If failure occurs in the Signup Valid process 2433, a sign-up error will be detected in a Sign-Up Error process 2434 and the RC App will alert the user and return them to enter a valid email and password 2432.

On the other hand, if the user has a previously registered email and password, the RC App will have the account in memory, and instead follow a basic user login and existing robot sequence, as also shown in FIG. 24A. In this case, an account will have been found to exist in the Account Exists process 2429 and the RC App checks in an Already Signed In process 2430 if the user already has signed in. Once the user is signed in, a Main Dashboard (RC App Homepage) Screen process 2415 displays an RC App homepage/main dashboard screen/page to the user, such as 1500 in FIG. 15. Then the RC App will search or look for any existing robot(s) in a Robot Search process 2431. If a robot(s) is found to exist in a Robot Exists process 2424, the RC App will load it (them) in a Load Robots process 2441 into a robot list of the RC App, which will appear on a main dashboard view (FIG. 15) to the user through the Main Dashboard (RC App Homepage) Screen process 2415.

If the Already Signed In process 2430 determines that the user is not already signed in, the user is directed, via a Sign-In Screen process 2417, to a sign-in screen, such as 1700 in FIG. 17 (described below), for the user to enter their email and password through an enter email and password process 2435, which entry will be validated or verified using a Login Valid process 2439. If the login fails the Login Valid process 2439, a login error will be detected in a Login Error process 2440 and a Forgot Password or Email process 2436 will allow the user to retrieve their password or to reset their password through a Password Reset process 2423 (or 2515 in FIG. 25B), by clicking the "forgot password?" link, button, or the like on the sign-in screen, such as 1705 in FIG. 17. In general, it should be understood in reference to FIGS. 24A, 24B, 25A, and 25B, that the user may go between using the RC App and using the company (e.g., the Modest Robot) web site or a third party web site, depending on the functions the user needs to perform or be performed for them. So, for example, to reset their password, the user may use the Internet access provided on their user control device, such as their smartphone, to access this capability on such websites. Or, to reset their password, the RC App may have the capability to go directly to such websites (whether through an API or otherwise), or such capability may be included as part of the RC App itself, for this service.

If the user did not forget their password or may have entered a wrong email address, they may try re-entering their email and password again using the Enter Email and Password process 2435. If they did forget their password, by selecting or clicking on the forgot password link 1705, the user will be allowed to request information to retrieve their forgotten password or to reset it to a new password. In either case, a password retrieval or reset request message will be emailed to the user's registered email address via a Send User Message process 2437. The user may then follow instructions provided in the email (not shown) to retrieve their password or to continue the process of resetting their password. If the user retrieves their password, they may enter their email and password and continue, as described above. If the user instead resets their password and a Password Reset Confirmed process 2438 confirms so, the user may then enter their email and reset their password as provided through the Enter Email and Password process 2435. Process flow then proceeds as described above.

Figure 15:
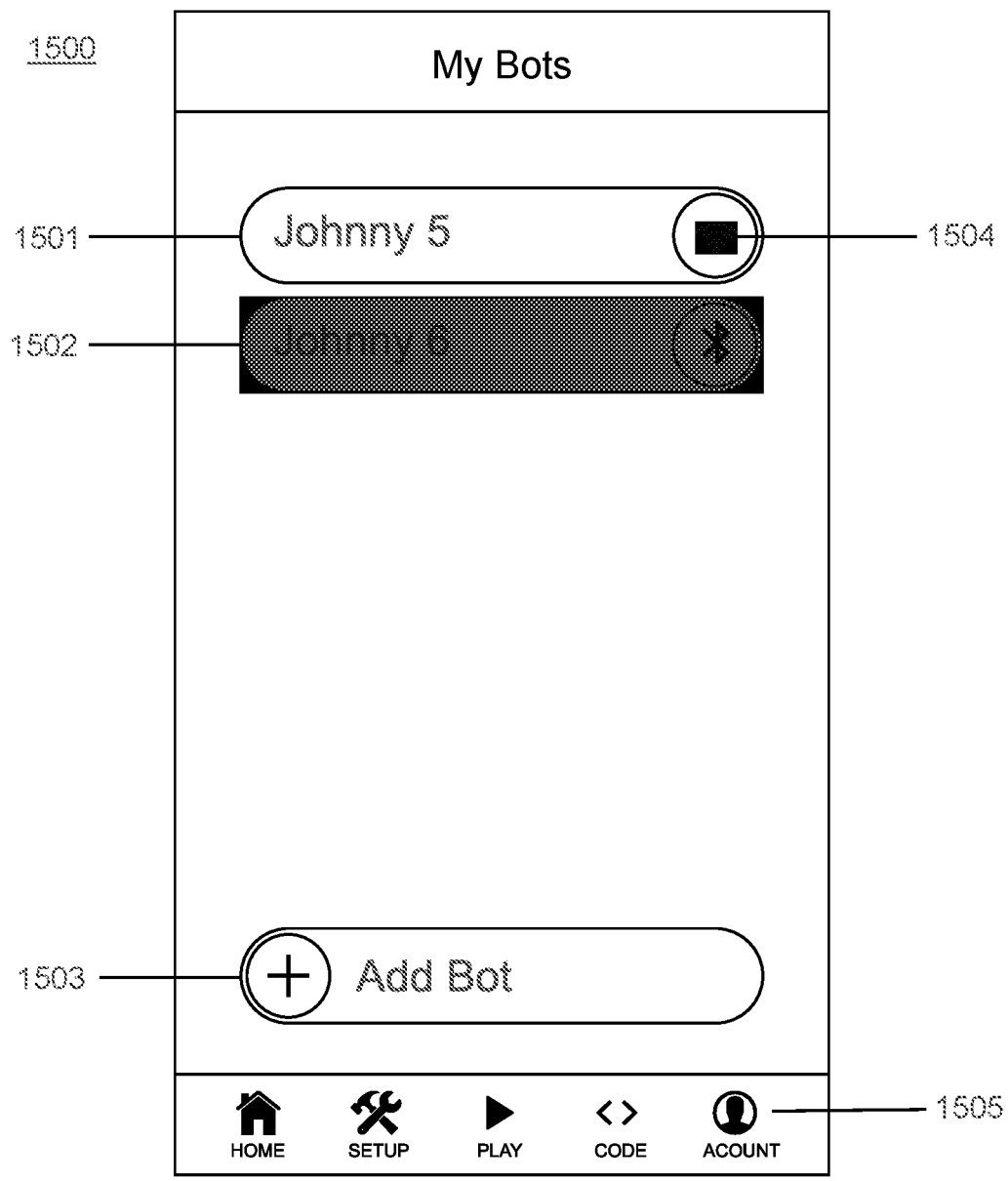
FIG. 15 illustrates an RC App Home Page, in accordance with embodiments of the invention.
Figure 20:
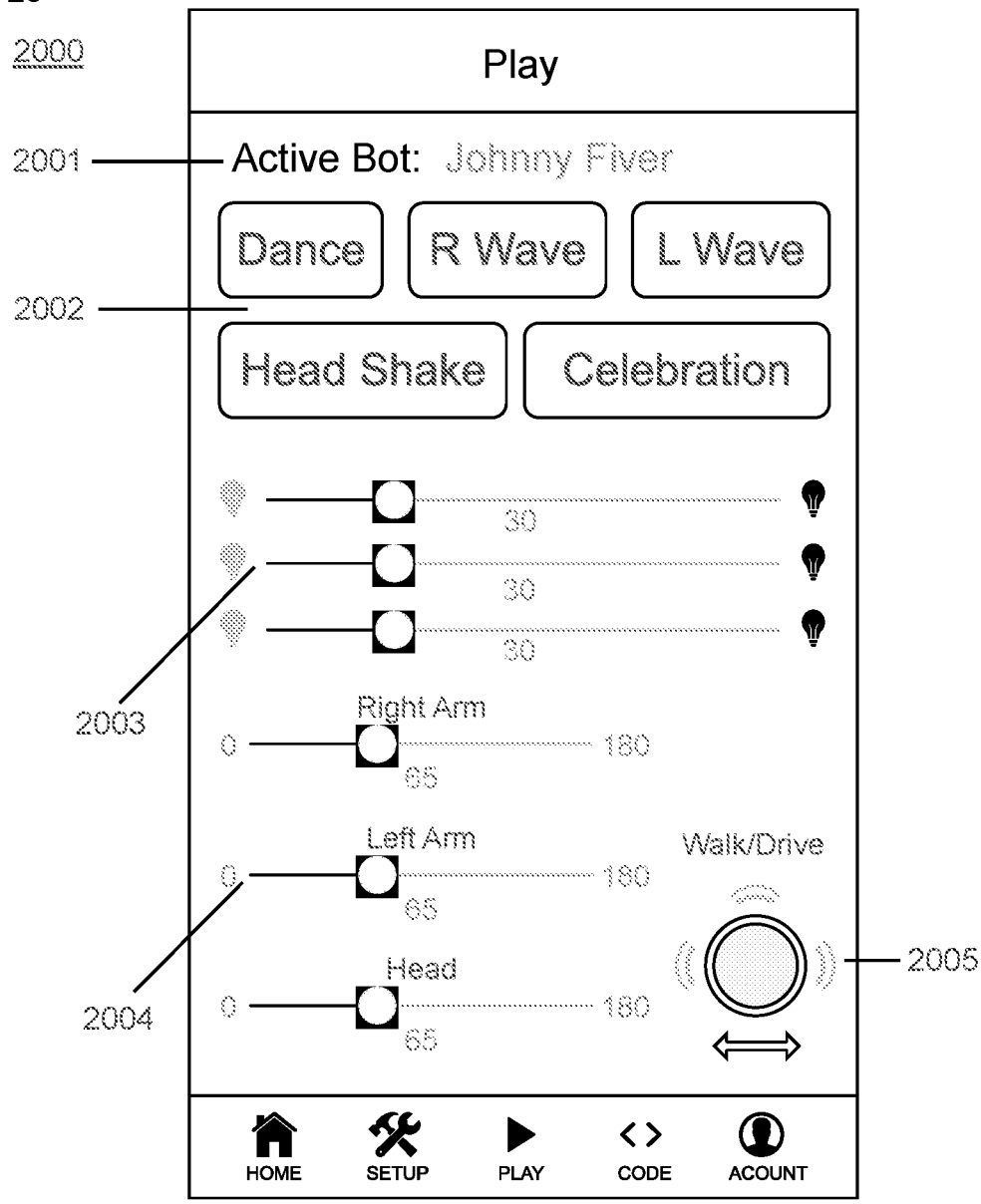
FIG. 20 illustrates an RC App Robot Play Page, in accordance with embodiments of the invention.

Once the user signs up and their account is verified, such as via their registered email address and password, they will be directed to a Password Reset process 2515 (or provided through the Password Reset process 2423). This may happen using the RC App or outside the RC App, as described above, for example, through any chosen backend service, such as Amazon Web Services (AWS). Then, as described in more detail below, the RC App will look or search for any existing robot in the account, such as through the Robot Search process 2431 (otherwise there will be a sign-up error through the Sign-Up Error process 2434, as shown in FIG. 24A):

- If a single connection or electrical or electromagnetic coupling by the wired or wireless communications and control exists between the user control device (i.e., a computer, handheld, such as a smartphone, or the like) and a robot, the RC App will communicate and connect to the robot and a Play Page process 2420 will provide a play page to the user, such as 2000 in FIG. 20.
- If multiple bots are connected or coupled by such wired or wireless communication and control, the RC App will flow to the Main Dashboard Screen process 2415, showing a dashboard screen to the user, such as 1500 in FIG. 15, which lists all added robots 1501, 1502 and identifies which are connected and communicating with the user control device (e.g., compare robot 1501, which has been added and is connected and communicating by WiFi, showing a connection strength signal or image 1504, to robot 1502, which is added but not connected and communicating by Bluetooth, so its connection strength signal or image is shown grayed out).
- If the user had added robots, such as shown by a link, button, field, or the like ("Add Bot" link) 1503 in FIG. 15, but none are connected and communicating with the user control device yet, the RC App will flow to the Main Dashboard Screen process 2415, which lists all created/added robots 1501, 1502 for the user's view. This view allows the user to simply tap on one of their robot's names, such as ("Johnny 5") 1501, to select it through a Select Robot process 2425 (FIG. 24B) as the active robot. Once tapped, the RC App tries to connect via a wired (if a wired connection is provided, as described herein) or a wireless connection, such as WiFi or Bluetooth. If a successful connection is detected by a Connection Success process 2426, the name (e.g., Johnny 5) of the robot becomes highlighted, for example, in the view shown in FIG. 15, and that robot is selected through a Robot Selected process 2427. If connection detection fails, the user is redirected to an add robots screen through an Add Robots Screen process 2422 to adjust the settings of the robot.
- If no robots are connected or communicating with the user control device, as determined by the Robot Exists process 2424, the RC App will flow to the Add Robots Screen process 2422, where they may add a robot, for example, via the link 1503. An Add Robot Success process 2442 will determine if the robot was successfully added or not. If not, an Add Robot Error process 2443 will display an error to the user, and the user may try to add a robot again. If adding the robot is successful, the Main Dashboard Screen process 2415 will redirect the user to the Main Dashboard, such as FIG. 15 (described further below) and cause the new robot to appear on there.

Main Dashboard Screen/Page

Referring further to FIG. 15, more details regarding the RC App Dashboard Screen/Page 1500, which may be a Mobile App Home Page, include the following. The RC App Dashboard Screen/Page 1500 may display a robot(s) 1501 the user has added by either creating an account and purchasing a robot (added automatically), or manually adding a bot themselves through the add bot screen 2422 (after their purchase), along with a display showing the type of connection (e.g., wired or wireless, such as WiFi, Bluetooth, or the like) 1504 used for coupling or connecting the user control device and the robot(s) for control of the robot(s). Those robots 1502 added that are not currently coupled or connected for control appear "grayed out" on the user's control device display. If the user purchases another robot, they may add it to the RC App Dashboard Screen/Page 1500 by selecting an "Add Bot" link, button, or the like 1503. Once the RC App is loaded (it is already loaded in FIG. 15), a main navigation bar 1505 will appear at the bottom of the user control device's display or screen. The user may use the navigation bar 1505 to visit all areas of the app.

In summary, the Dashboard Screen/Page 1500 shown in FIG. 15 is the main RC App page, which displays the following:

Page Header, which displays the name of the current page
All the robots the user has already added
  Added and connected robots 1501 are highlighted
  Added but not connected robots 1502 are dimmed
  Ability to add 1503 a new robot via an Add Robot process 2444
Connection signal strength indicator 1504
Main RC App navigation bar 1505

Figure 22:
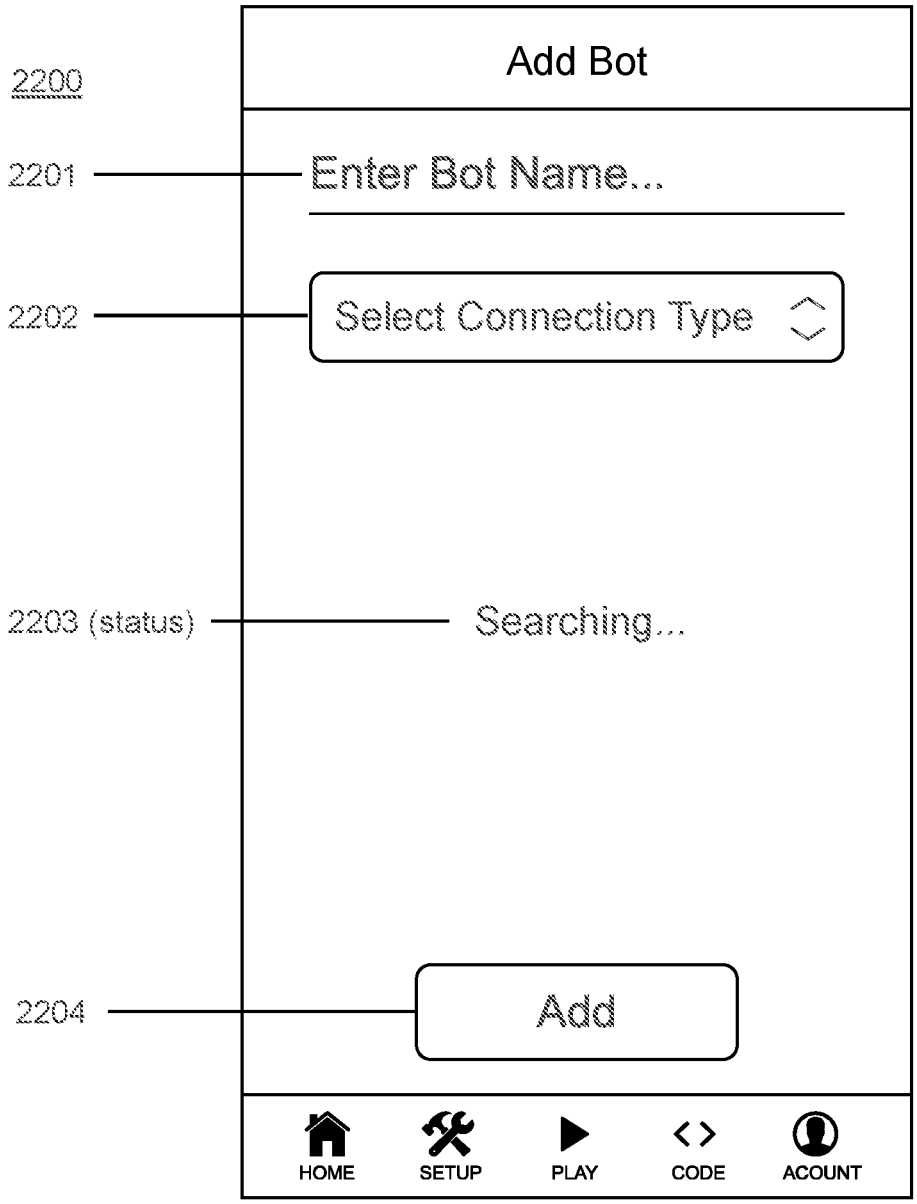
FIG. 22 illustrates an RC App Add Bot Page, in accordance with embodiments of the invention.

While on the RC App Dashboard Screen/Page 1500, if the user selects or clicks on an unconnected or uncoupled robot, a Select Robot process 2425 (FIG. 24B) will attempt to make a wired or wireless connection or coupling via the Connection Success process 2426. If connection fails, the Add Robots Screen process 2428 (or 2422 in FIG. 24A) will redirect the user to an Add Robot (connection) screen 2200 (FIG. 22). If the robot has already been added, all the fields will be pre-populated in the Add Bot screen 2200, but this gives the user an opportunity to change (select) the robot's connection type/settings 2202.

Create New Bot/Connections

Clicking or selecting "+Add Bot" 1503, as shown in FIG. 15, will take the user to the Add Bot screen 2200 in which the user may name a new robot 2201, choose or select the connection type 2202, such as wired or wireless, as described above, add the robot 2204, and connect the user control device running the RC App to the new robot. During the process of adding the new robot, the user may see a connection status 2203 for the robot displayed, such as "Searching," which indicates that the user control device is searching for and trying to connect to the new robot. Once the new robot is found and a connection is established with the user control device, the connection status 2203 displayed may change to "Connected."

RC App Setup/Build Page

Figure 13:
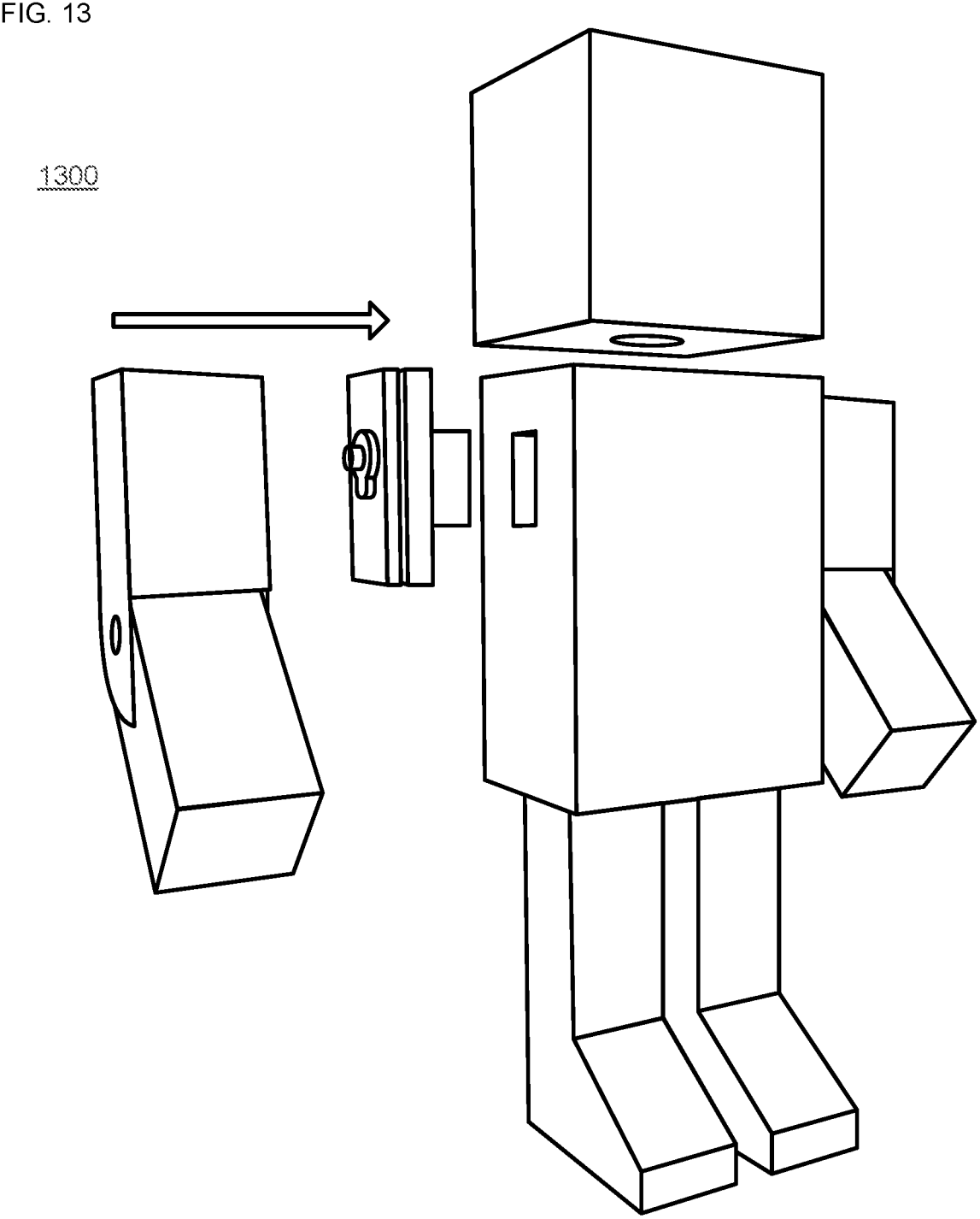
FIG. 13 illustrates setup videos, showing a 3D-rendered model animated to show a current step of robot assembly, in particular showing how to attach a robot arm to a robot torso, in accordance with embodiments of the invention.
Figure 19:
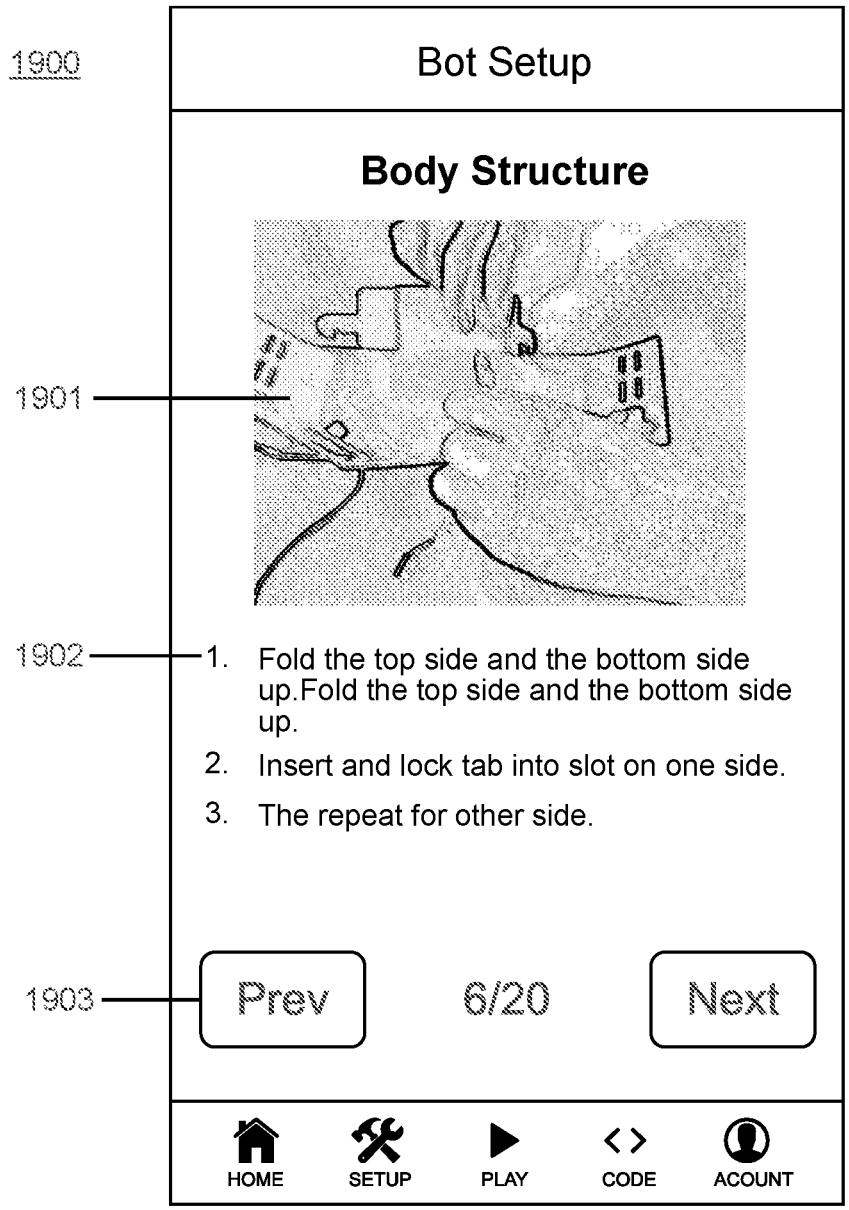
FIG. 19 illustrates an RC App Robot Setup Page, in accordance with embodiments of the invention.

When the user or customer first sets up a new robot, they may be directed via a Setup Page process 2419 to an "RC App Setup/Build Page" or "Bot Setup Page," shown as 1900 in FIG. 19 accessed through the main dashboard 2415. The RC App Setup/Build Page 1900 takes the user through all the steps necessary to assemble, build, and activate the user's robot, get it onto a network (wired or wireless, or a combination of both, which may include the Internet), and connect it to the RC App running on the user control device. For the building steps, animated images 1901 depicting each or the current setup step may be included, along with step by step instructions, text, and/or descriptions 1902, and pagination controls 1903, to help the user navigate through the robot setup steps. The animated images 1901 may include setup GIFs or videos that act as setup guides. Each step and/or the GIFs or videos may cover one or more areas of the setup process, for example, for assembling the torso, connecting the arms to the torso, linking to their robot via a wired or wireless network, or the like. An exemplary embodiment for a portion of one of these possible robot setup GIF(s), video(s), image(s), diagram(s), etc. 1901 (e.g., for attaching the arm appendage) is illustrated as 1300 in FIG. 13.

Play Page

Via the Play Page process 2420, the user may be directed to a Play Page, shown as 2000 in FIG. 20, which includes all the controls the user needs to move or animate whichever robot has been selected as an active or current robot 2001. The controls available for the user will vary based on which robot type the user has selected, for example:

Standard 3 servo bot
3 servo robot with RGB LED(s)
3 servo robot with motor(s) for locomoting
4 servo robot
4 servo robot with RGB LED(s)
Robot accessories included
RGB LED(s)

Figure 21:
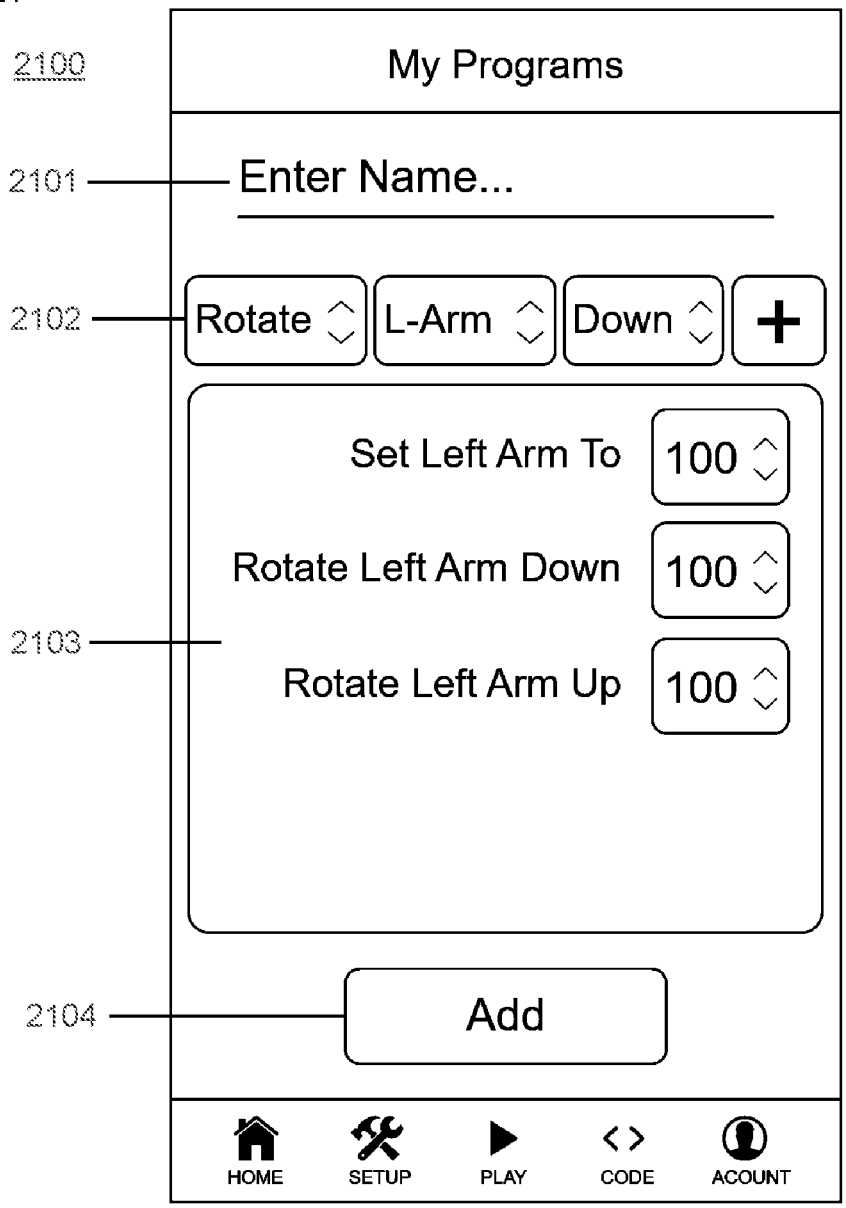
FIG. 21 illustrates an RC App Code Page, in accordance with embodiments of the invention.

The Play Page 2000 may also have buttons, selectors, links, or the like 2002 that allow the user to run any pre-coded actions or animations created via a Code Page process 2421 on an RC App Code Development or Code Page, shown as 2100 ("My Programs") in FIG. 21. The Play Page 2000 may also include sliders, buttons, controls, or the like 2003 to manually control the RGB LED(s), such as their color output. Each slider controls, for example, one channel of color. Increasing the red channel may provide more red output, increasing the blue channel may provide more blue output, increasing both the red and blue channels may provide magenta, etc. The Play Page 2000 may also include sliders, buttons, selectors, controls, or the like 2004 to control each individual servo for the robot. By adjusting these sliders 2004, the user may adjust each servo or motor to its corresponding degree of rotation, for example, for the right arm, left arm, or head. If the user purchases a robot having a form of locomotion like walking or driving, a digital joystick or other similar functional control 2005 also may be available, which the user may slide up, down, or side-to-side to control the robot's movement.

RC App Code Development or Code Page

The Code Page 2100, as shown in FIG. 21, may be used for creating and saving the user's own programs (My Programs). These programs may be basic programs that allow a robot to sequence through several motions (e.g., poses) with a single tap of a button, selector, or the like by the user. On the Code Page 2100, the user may create a program of a sequence of movements (poses) (that may be stored in a memory (not shown) on the user's control device, and/or that may be stored, for example, in the Cloud, once the user's control device is connected to the user's account), such as:

Set Right Arm to [(degrees)]
Set Left Arm to [(degrees)]
Set Head to [(degrees)]
Rotate Left Arm Up [(degrees)]
Rotate Left Arm Down [(degrees)]
Rotate Right Arm Up [(degrees)]
Rotate Right Arm Down [(degrees)]
Rotate Head Right [(degrees)]
Rotate Head Left [(degree)]
Increase Red channel [(amount)]
Increase Green channel [(amount)]
Increase Blue channel [(amount)]

The user may give their program a name 2101, which may also be used as a label for the button, selector, link, or the like 2002 for running pre-coded actions or animations on the Play Page, as shown in FIG. 20. The user also may use a drop-list sequence 2102, as shown in FIG. 21, to create and/or add a step(s) in their program for robot animation or motion. Once such a step(s) is added, the user may adjust one or more numbers of degrees 2103 for each of the step(s) created and/or added. Each degree setting, for example, may be moved in 10-degree increments from 0 to ±180 degrees or in other increments, such as greater than or less than 5 degrees up to ±180 degrees or even ±360 degrees. Other possible degree increments are contemplated within the scope of the invention.

Once the user completes their step(s) sequence, they may add their program 2104 to their program list, which is saved into their account and may be displayed on the Play Page 2000 as the button, selector, link, or the like 2002 in FIG. 20. Once executed from the Play Page 2000, the user's program sends the programmed step(s) in sequence to the active robot for storage in the memory 103 for later possible execution by the processor 101. The user may then control the robot using the user control device to run through the sequence of programmed movements in their program, which may rotate the desired rotor(s) (servo arm(s)) to the specified degree(s), etc. The user may also adjust each channel of the RGB LED(s) in a similar manner through such programming so that the LED(s) will run through an associated programmed sequence(s) of blinking and/or fixed colors of light output.

User or RC App Account Page

Figure 18:
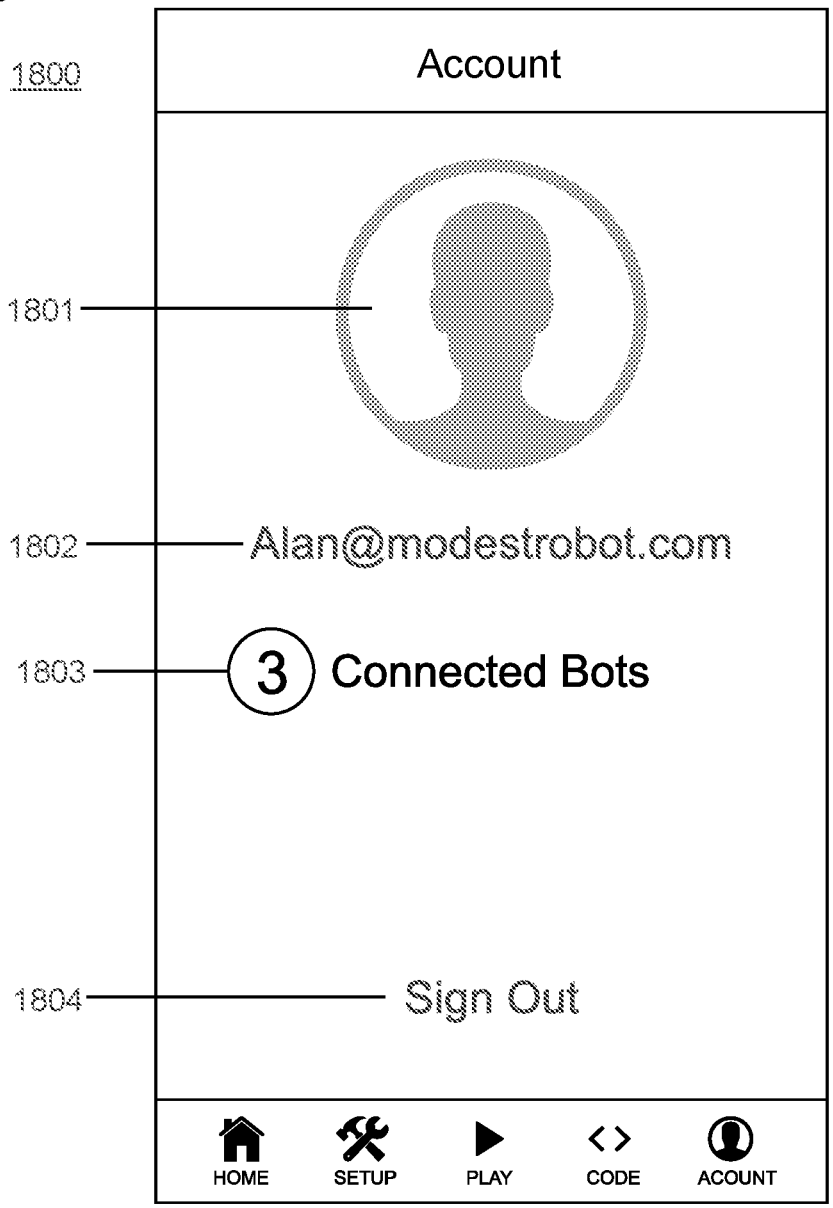
FIG. 18 illustrates an RC App User Account Page, in accordance with embodiments of the invention.

Via an Account Page process 2418 (FIG. 24A), a user Account Page 1800, as shown in FIG. 18, may handle the user's account creation and login. The User Account Page 1800 may be used to support or provide a user (or a different user) with the ability to log in by selecting, tapping, or the like on a user's account name 1802, and once the user is logged in via 2417, the user will then be informed of the number of robots 1803 they have added to their account that they have purchased. The User Account Page 1800 may also provide the logged in user with access to their already added/connected robots by selecting, tapping, or the like on an added robots button, link, or the like associated with the number of robots 1803. The list of all their robots will then appear to the user, allowing them to select or choose which robot they want to connect to and interact with. The user also may select or choose to log or sign out by selecting, tapping, or the like on a sign out button, link, selector, or the like 1804 if they want to or if another user wants to log into the RC Control App to control their robots using the same user control device.

Figure 16:
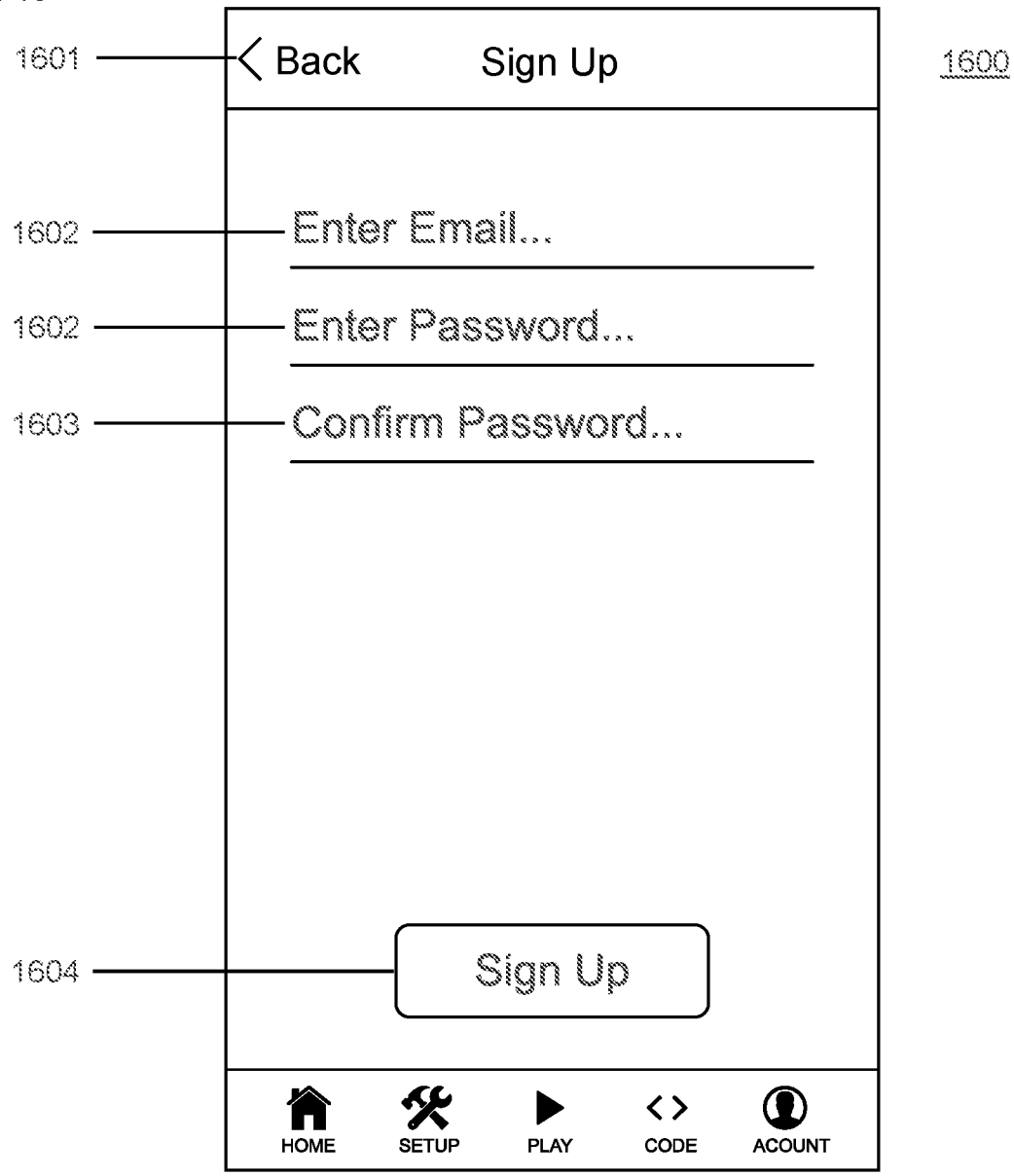
FIG. 16 illustrates an RC App Sign-Up Page, in accordance with embodiments of the invention.
Figure 17:
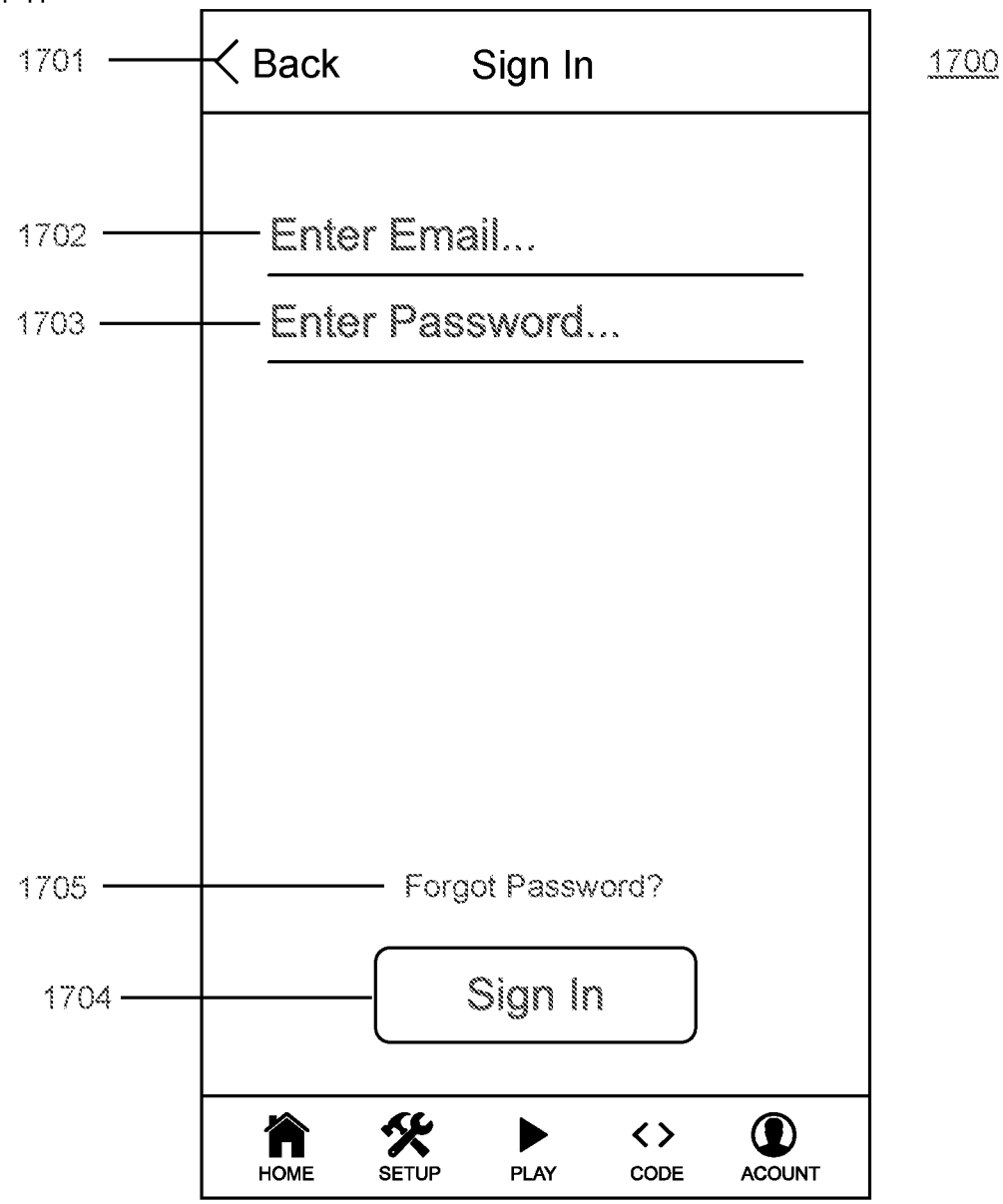
FIG. 17 illustrates an RC App Sign-In Page, in accordance with embodiments of the invention.

In using the RC Control App, the user may also experience the following in addition to what has been described above:

1) No account exists: via the Account Exists process 2429 (FIG. 24A) and the Signup Screen process 2416, the user will land on or go the Account Sign-Up Page 1600, as shown in FIG. 16 (described below).
2) Account exists, but not logged in: via the Account Exists process 2429 and the Sign-In Screen process 2417, the user will land on or go to the RC App Sign-In Page 1700, as shown in FIG. 17 (described below).
3) Account exists and already logged in: via the Account Exists process 2429 and the Sign-In Screen process 2417, the user will land on or go to the User or RC App Account Page 1800, as shown in FIG. 18, which may display an image or gravatar 1801 of the user (if they have one), the user's account name (or email address) 1802, the number of robots they already have added to their account 1803 (if any), and the link, button, selector, or the like 1804 to log or sign out.

Referring again to FIG. 16, the RC App or Account Sign-Up Page 1600 for the user is illustrated, in accordance with an embodiment of the invention. The RC App or Account Sign-Up Page 1600 includes a sign-up form having fields for the user to enter identification/authentication information, such as the user's email address 1602, a desired password 1603, along with a password confirmation field 1603. Once filled in, the user may create their account by clicking or selecting a "Sign Up" link, button, selector, or the like 1604. The user also has the ability on this page to navigate back 1601 to the main User Account Page (FIG. 18), described further below.

Referring again to FIG. 17, the RC App Sign-In Page 1700 is illustrated, in accordance with embodiments of the invention. The RC App Sign-In Page 1700 includes the sign-in form having fields for the user's email address 1702, saved password 1703, and a sign-in link, button, selector, or the like 1704. Once an account is created, the user is automatically directed to their list of robots 1500 as they enter the RC Control App, or are directed to the add robots screen 2200 if none are already added. If multiple accounts exist in the RC Control App, the user may select a different login from the account page by selecting, tapping, or clicking where the user's account name or email address 1802 would appear, or by selecting, tapping, or clicking on a list of account icons (not shown). The user also has the ability on the RC App Sign-In Page 1700 to navigate back 1701 to the main User Account Page (FIG. 18).

Referring again to FIG. 18, the RC App or User Account Page 1800 is illustrated, in accordance with embodiments of the invention. If the user has a gravatar account, their gravatar image 1801 may be displayed, otherwise they may see a generic stock image. The RC App or User Account Page 1800 also may display the user's account name or email address 1802 and how many robots 1803 they currently have connected or coupled to the app. The user also may log out 1804 of the Robot Control App, for example, if they are finished or to allow someone else to log in to play with or control their own robots, as described above.

Figure 27A:
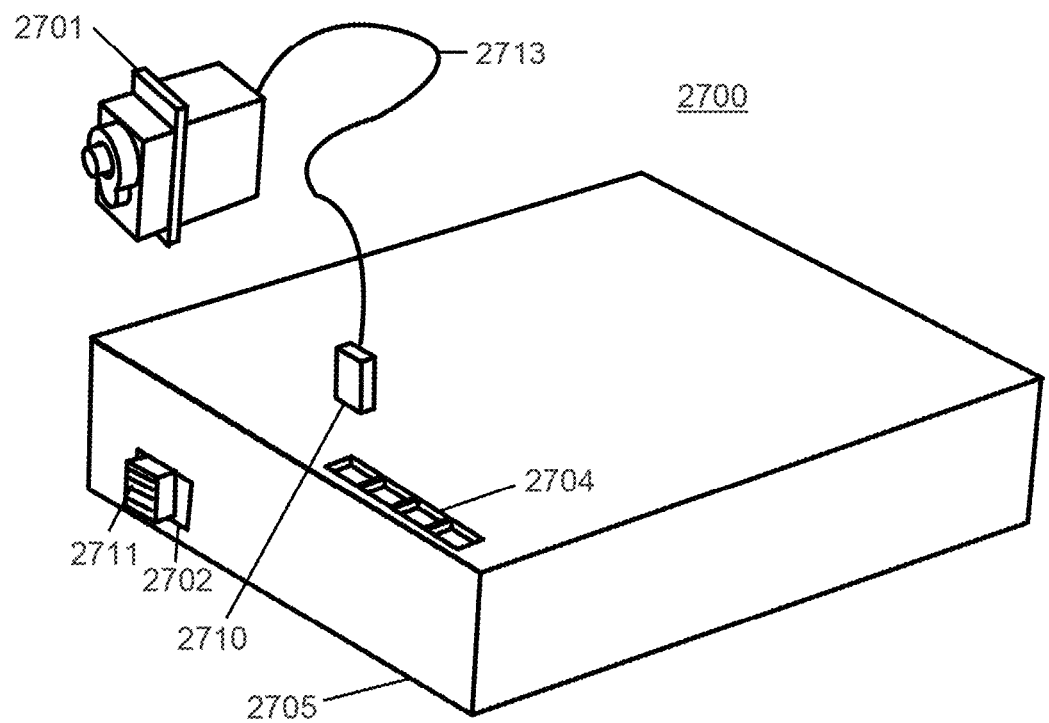
FIGS. 27A and 27B illustrates, in perspective views, a controller module for containing both the control unit board and power supply in a compact form, in accordance with embodiments of the invention.
Figure 27B:
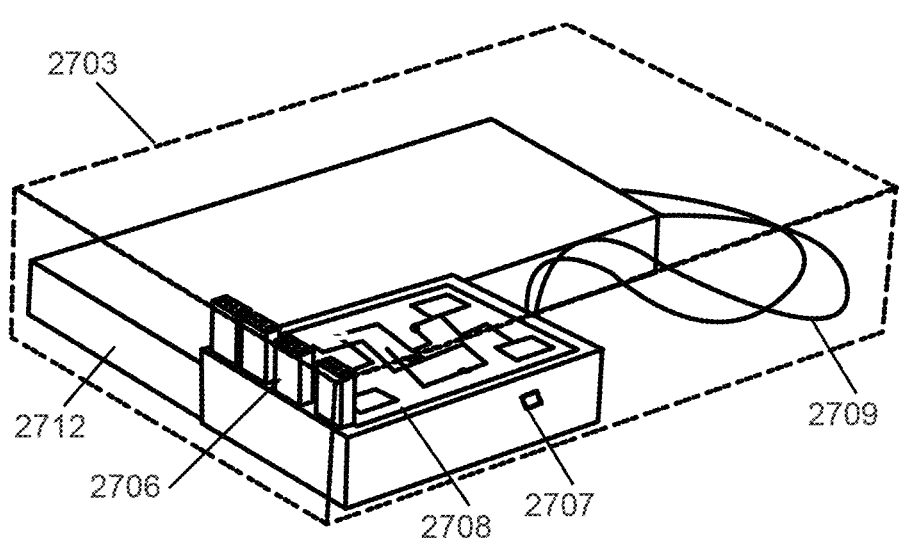

Referring again to FIG. 1 and also to FIGS. 27A and 27B, for animation, motion, and control of the robot the control unit board 100 itself and the servo(s) 112, LED(s) 111 and possible miscellaneous components 114, such as a motion sensor, microphone, or the like, which may be added to or included in or as part of the robot, all require a power source (e.g., a power source 2712 shown in FIG. 27B). The power source 2712 may be the rechargeable battery(ies) or pack 109, non-rechargeable battery(ies) or pack 110, or the like, or a combination thereof. The power source may be stored in the torso 1101 (FIG. 11) of the robot, such as in a container that will be described below with respect to FIG. 27B. In accordance with some embodiments of the invention, an Ultra Slim Credit Card Power Bank 2600 mah with Cable Polymer External Battery Backup Power Charger 2600 mah may be used as the power source. In accordance with other embodiments of the invention, the power source may be included as part of or on the control unit board 100.

The Input/Output (I/O 104) of the control unit 100 shown in FIG. 1 may provide for electrical and/or electronic connection and coupling of ground, power, and signals/control voltages/currents, as needed, for the robot to drive: (i) the LED(s) 111, for example, RGB Common Cathode LED(s) that may have associated current limiting resistors; (ii) the servos 112; and (iii) other possible optional components, such as Dual-Axis Gear Reducer Motors, which may be used for any continuous circular motion, such as rolling wheels, or creating a walk cycle for the robot. Other types of LEDs may be used instead or in addition, such as 4-color (RGBV) LEDs.

Referring to FIG. 27B, a partially transparent view of a CardBot Board and Power Source Unit housing or container 2700 is schematically shown for holding or mounting a control unit board 2708 (like the control unit board 100) inside the robot, in accordance with embodiments of the invention. FIG. 27B also shows that the power supply or source 2712 (such as the power sources 109 and/or 110) may be contained or mounted within the container 2700. The container 2700 may be made or constructed of a plastic, polymer, or other durable and lightweight material, such as chipboard or the like. The container 2700 may be a dual compartment container, which contains both the power source 2712 and the control unit. The container 2700 may be constructed of a bottom portion 2703 and a top portion 2705. The top portion 2705 may also feature an appropriately-sized opening(s) 2704. This opening(s) provide(s) access for wires 2713, 505 of the servo(s) 2701, 112 to make electrical and/or electronic connections or couplings through conductive pins or the like in a connector(s), plug(s), plugin(s), couplers, ports, receptacles, or the like 2710 ("connector(s)") to mate to corresponding and/or complementary connector(s) 2706. The connector(s) 2706 are further electrically and/or electronically coupled through the I/O 104 (FIG. 1) (not shown in FIG. 27B) to the control unit board 2708, for example, for providing ground, power, and signals/control. One or more other openings 2702 also may be provided to make electrical and/or electronic connections or couplings for an RGB or another LED(s) 2711 on the container 2700 or for an LED(s) (e.g., LED 111) (not shown in FIG. 27A) on the robot, as described herein. The openings 2702 and 2704 may be appropriately labeled to identify the location and type of connection to be made and/or for which component(s) is to be connected to the particular terminal pin(s) or terminal connector(s).

The power (which may have, for example a voltage of 5V associated therewith) provided to drive the servo(s) 2701 (like the servos 112) may be obtained from the power source 2712 (like the battery(ies) 109 and/or 110) via a power input (not shown) (like the power input 113), which may include positive/negative wires 2709 of the power source 2712, coupled or connected through a control unit board 2708, the connector 2710, and the wires 2713 (like the wires 505). In embodiments having a custom controller board (PCB) 2708 that includes electrical traces, power to drive the servo(s) 2701 instead may be obtained from the power source 2712 through the wires 2709 coupled or connected to the traces, which in turn couple or connect through the connector 2710 to the wires 2713.

Such electrical and/or electronic connections or couplings also allow signals/control to be provided by a processor 2707 (like the processor 101) for the servo(s) 2701. The processor 2707 and other components of the control unit board 2708 (as well as other components, such as the servos, LED(s), etc. described above) all may be powered through an on/off power switch 2707 electrically and/or electronically connected or coupled to the positive/negative wires 2709 of the power source 2712. Using the power switch 2707 allows power or battery charge to be conserved when turned off. The power switch 2707 may protrude through the housing or container 2700 to provide user access.

The size and placement of the system of components described above, in accordance with embodiments of the invention, allow or provide for secure and safe attachment of the structural components, ground, power, and signals/control for the robot. Users should generally easily be able to identify where and how to attach or plug in the various described system of components.

Referring to FIGS. 28A-28I, openings in the paper chipboard are illustrated for various connector embodiments 2804 (like the inner 200 and outer 300 connectors in FIGS. 2-2E and 3A-3D, respectively), 2805 (like the inner 806 and outer 800 connectors in FIGS. 8A-8F, and 2806 (like the inner 900 and outer 906 connectors in FIGS. 9A-9F). As described herein, these various connector embodiments may be used or may be configured or configurable to be used for securing the servo housing or servo motors and the chipboard. Also, for these various connector embodiments, their corresponding magnet portions, clips (or clipping, including where the clips grab or bear against) portions, and locking portions, as described herein, may be referred to as types or sets of fasteners, couplers, joiners, or the like that may be used or may be configurable to be used for securing the servo housing or the servo motor and the chipboard. Openings 2801 in the chipboard, in each case, may be slightly larger than the dimensions of the rotor arms of the servos, for example, approximately 22.7 mm long and 12.0 mm wide inclusive (approximately meaning ±0.1 mm). Additional or larger openings 2802, 2803 may be made or included to accommodate the various connector types that utilize clips or other non-magnetic connections. Moreover, further additional or larger openings may be made or included to accommodate the size of other structures or features in any of the disclosed embodiments, such as for accommodating the size of the arm cover or arm cover apparatus 202.

Figure 23:
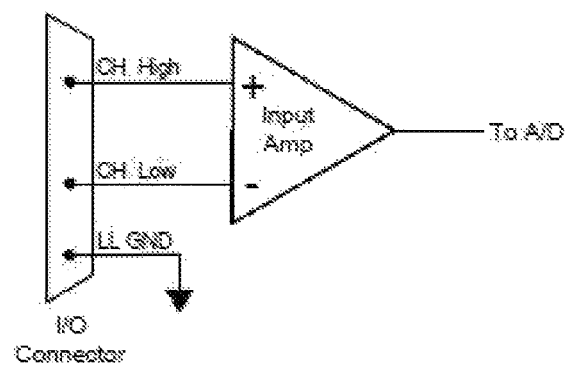
FIG. 23 illustrates a differential input sensor, in accordance with embodiments of the invention.

In accordance with an embodiment of the invention, referring to FIG. 23, the robots described herein may include the use of differential input(s)/output(s) for the I/O 104 in the control unit board 100. Such differential input(s)/output(s) may reduce(s) the effects of low-level ground fluctuations, which makes the control unit board 100 more immune to noise, which generally would be present on the I/O leads. Differential mode may allow the noise to be subtracted from the control signals or operating voltages for the LED(s), servos, and other optional components, as would be understood by one of ordinary skill in the art.

Company Website

Figure 25A:
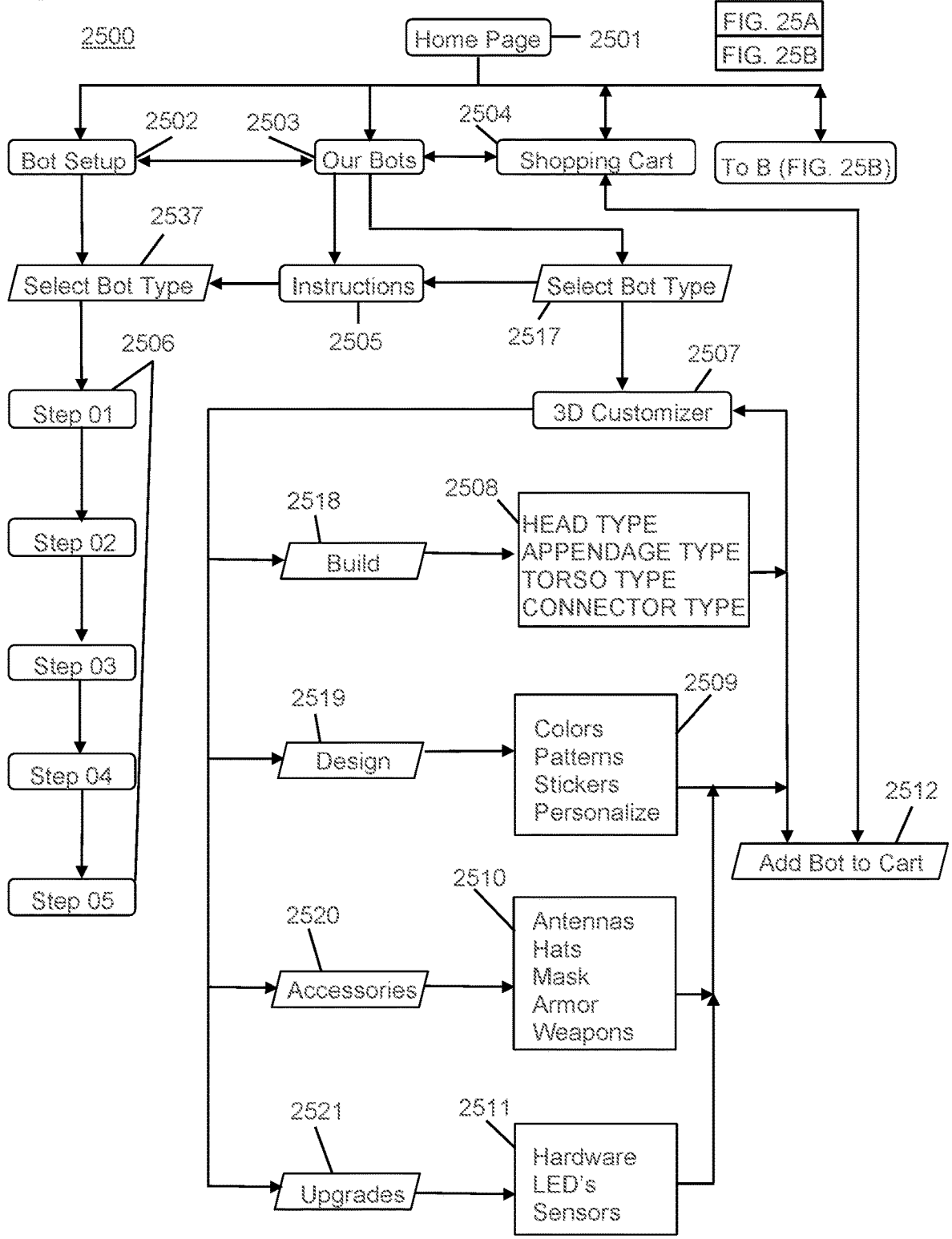
FIGS. 25A and 25B are a flowchart of a website (e.g., a company website), in accordance with embodiments of the invention.
Figure 25B:
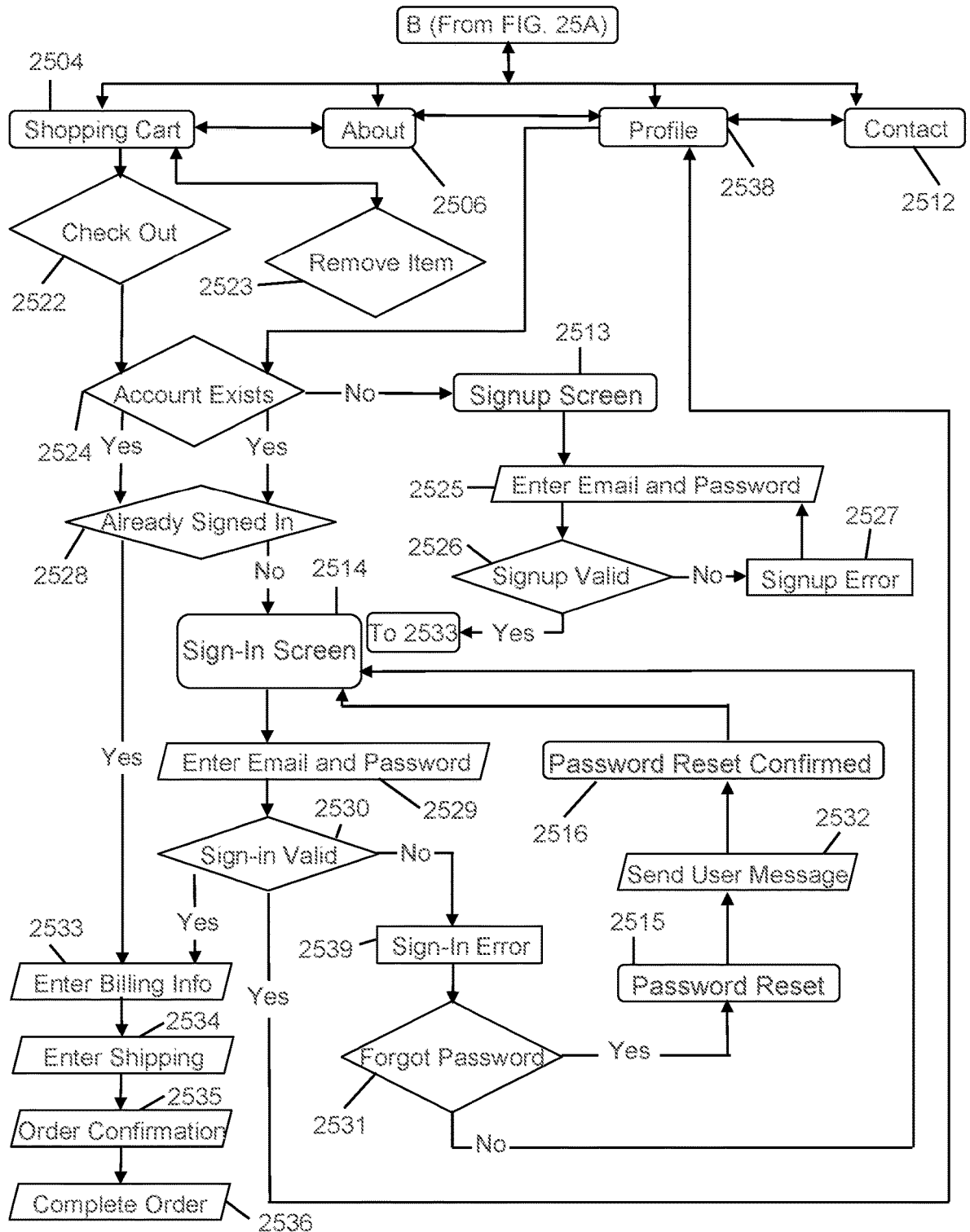

Referring FIGS. 25A and 25B, a process or method flowchart 2500 for a website (not shown) associated with the robot(s) is illustrated, in accordance with embodiments of the invention. The website may be a company portal (e.g., a portal for Modest Robot), providing related web pages, multimedia content, and other network resources, published on one or more web servers. Exemplary resources may be the company's main sales and informational page(s), and other pages. In accordance with embodiments of the invention, the web site syncs with the RC Control App, as needed, such as for showing a list of robots the user already has purchased. Various features of the flowchart 2500 and the company website are described below.

Website Components

As illustrated in the flowchart 2500 for the website, the user may navigate amongst processes for Home Page 2501, Bot Setup 2502, Our Bots 2503, Shopping Cart 2504, About 2506, Profile 2538, and Contact 2512, which are all parts of the main company (e.g., Modest Robot) website processes, allowing the user to switch between corresponding web pages quickly. These processes and their associated web pages are described further below.

Home Page

As illustrated in the flowchart 2500 of FIGS. 25A and 25B, the Home Page process 2501 provides a home page(s) containing a brief overview of robot products available for purchase, an introduction to the company's story, images and videos of a selection of the company's available robots, and links to pages provided by processes for Root Setup 2502, About 2506, Contact 2512, Our Bots 2503, Shopping cart 2504, User Profile 2538, and to other pages that may be included or added later. The page corresponding to the Our Bots process 2503 may display all of the company's existing robot designs available for purchase.

Company Robots/Robot Customization
Robot Customization Window/Screen/Page in Website Via the Our Bots process 2503, a list of all of the available robots will be presented to the user on a web page (e.g., a company, such as Modest Robot, web page). A Select Robot Type process 2517 allows the user to select one of these robots from the list, after which a 3D Customizer process 2507 provided as part of the website will allow the user to customize their chosen robot through the Robot Customization Window/Screen/Page 1201 discussed above and shown in FIG. 12. The Customization Window 1200 may feature a 3D model of the chosen robot 1201 for design, customization, or ordering and purchase. As part of these features, the user may rotate 1202 the robot 1201, for example, through and including 360 degrees in the view. The user also or instead may modify or change features of the robot 1201 via the Build 2518, Design 2519, Accessories 2520, and Upgrades 2521 processes shown in FIG. 25A. For example, the user may select or swap-in various upgrades, such as hardware, LEDs, and/or sensors available to them via Upgrade processes 2521 and 2511, or other options, such as head or arm type, via Build processes 2518 and 2508, or other options, such as antenna and hats, via Accessories processes 2520 and 2510, or other options, such as color, patterns, and stickers, via Design processes 2519 and 2509. The user may swap these options in or apply them 1203, as illustrated in FIG. 12, to the robot model 1201 using the buttons, selectors, or the like shown schematically in FIG. 12. As the user adds or changes these accessories, designs, options, etc. to their robot 1201 in the customization window, the cost for them may be added to the total cost, which may be shown to the user in a real-time display along with the total cost 1204, so there are no surprises upon checkout. Once the user is finished designing their robot, they may select or click the "Buy" selector, button, link, or the like 1205 to make the purchase. For certain embodiments, if a design pattern is added by the user, the robot may be shipped to them with the pattern already printed on the surface(s) of the robot.

Bot Setup Page/Setup Your Bot

From the home page(s) provided to the user via the Home Page process 2501 or elsewhere in the website, the user or customer may want to select or go to a robot setup page provided through the Robot Setup process 2502. The user may thereby gain access via the Our Bots process 2503 and Instructions process 2505 to a page having instructions for setting up whichever robot they have purchased or will purchase. The instructions are provided to the user as a step-by-step guide through a Select Robot Type process 2537 and a Step 01, Step 02, etc. (guide) process 2506. The step-by-step guide is for each phase of robot assembly, and also may be available similarly in a mobile version of the RC Control App for those users who will be using their mobile device as the user control device for robot control.

Shopping Cart

The Shopping Cart process 2504 allows the user to add items, as described above, or to remove items from their shopping cart via a Remove Item process 2523. The shopping cart may be a standard web purchase page, where the user may make the actual purchase. For example, the user may purchase their robot(s) using a credit card, debit card, PayPal, Venmo, or the like via an Enter Billing Information process 2533. They may also enter their shipping information via a Shipping process 2534, and then confirm their order via an Order Confirmation process 2535, after which their order is completed by a Complete Order process 2536.

Prior to checkout, the web site determines if the user already has an account via an Account Exists process 2524. If an account does not exist, the user is directed to a sign-up screen or page via a Signup Screen process 2513, where they may create an account by entering their email and password via an Enter Email and Password process 2525. The website then determines if the signup attempt was successful in a Signup Valid process 2526. If signup fails, the user is presented with an error via a Signup Error process 2527 and directed to enter their email and password again via the Enter Email and Password process 2525. On the other hand, if signup is successful, the user is automatically signed in, and will not have to follow the normal sign in flow, and, for example, will be directed to the Enter Billing Information process 2533.

If the user already has an account as determined via the Account Exists process 2524, the web site checks if they are already signed in via an Already Signed In process 2528. If not, they are directed to a sign-in screen via a Sign-In Screen process 2514, where the user must enter their email and password via an Enter Email and Password process 2529. The website will then determine if the sign-in was a success via a Sign-In Valid process 2530. If not, the user is presented with a sign-in error via a Sign-In Error process 2539, and may request a new password by selecting a forgot password option via a Forgot Password process 2531. The user is then allowed to reset their password via a Password Reset process 2515 and is sent an email message to reset their password via a Send User Message process 2532. Once their password is reset, it is confirmed by a Password Reset confirmed process 2516, the user is taken to the sign-in screen provided by the Sign-In Screen process 2514, and so on.

Profile

Referring to FIG. 25B, via a Profile process 2538 (FIG. 25B), a user's profile may be accessible for any user who already created or will create an account on the company web site or in the mobile app. When the user wants to make a purchase, they may be asked to create an account (e.g., it may be the same account they would use to log into the RC App). Upon account creation or log in, all robots purchased will appear in their account, both on the website and in the RC App. This may provide generally easy access to the setup instructions described above for each robot and also may tie into the company (e.g., Modest Robot) RC app. All robots added here will appear as options in the company RC app, and all robots manually added in the company RC app also will appear.

Contact Page

Referring again to FIG. 25B, potential and/or current users may choose to contact the company (e.g., Modest Robot) to ask questions about the site or the robot products by going to a Contact Page (web page or screen) provided through a Contact process 2512.

About Page

Referring again to FIG. 25B, via an About process 2506, potential and/or current users may access a web page or screen about the company, which, for example, may tell the story of the company and its mission.

Figure 26:
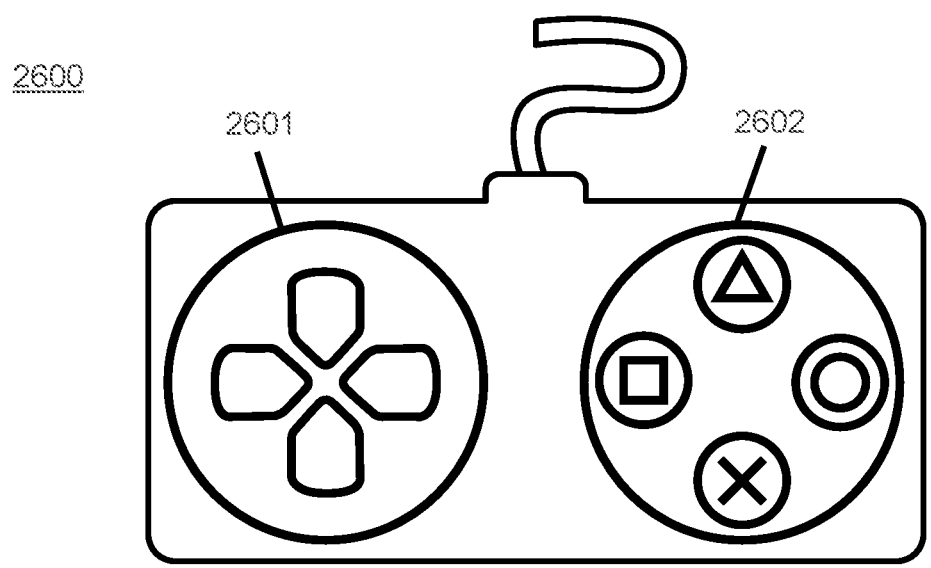
FIG. 26 illustrates an optional wired remote controller, in accordance with embodiments of the invention.

In accordance with embodiments of the invention, referring to FIG. 26, an optional wired remote 2600 discussed above is illustrated. The wired remote 2600 may include a digital touch or haptic pad, or buttons, selectors, or the like 2601, which may be used to control the rotors of the servos for moving the robot or its appendages. For example, touching or pressing up rotates the particular rotor clockwise, touching or pressing down rotates the particular rotor counter-clockwise, and touching or pressing left or right cycles through the available servo rotors to choose between them. A digital touch or haptic pad, or buttons, selectors, or the like 2602 may also be included, which, when touched or pressed, may be used to play one or more of the user- or company-provided pre-programmed robot motions (e.g., dance, celebrate, raise arm, move leg, wave, turn head, look around, flash LED(s), change LED(s) color, or the like, as described above).

The specific embodiments disclosed herein are merely exemplary, and it should be understood that within the scope of the appended claims, the invention may be practiced in a manner or manners other than those specifically described in these embodiments. Specifically, it should be understood that the claims are not intended to be limited to the particular embodiments or forms disclosed, but rather to cover all modifications, equivalents, and alternatives falling within the spirit and scope of this disclosure. Also, any structures, components, or process parameters, or sequences of steps disclosed and/or illustrated herein are given by way of example only and may be varied as desired. For example, for any steps illustrated and/or described herein that are shown or discussed in a particular order, these steps do not necessarily need to be performed in the order illustrated or discussed. Further, the various exemplary structures, components, or methods described and/or illustrated herein may also omit one or more structures, components, or steps described or illustrated herein or include additional structures, components, or steps in addition to those disclosed.

The invention claimed is:

1. A connector securing a servo to a toy body part thin material, comprising:
 a first connector portion including:
  a first set of couplers, and
  a first opening;
 a second connector portion including:
  a second set of couplers, and
  a second opening;
 a toy body part thin material; and
 a servo having a rotator arm portion, wherein the rotator arm portion extends through the first opening of the first connector portion and protrudes outward from the first opening of the first connector portion on a side of the first connector portion that is away from the second connector portion, and wherein the first and second connector portions secure the toy body part thin material to the servo on a different side of the first connector portion that is toward the second connector portion.

2. The connector of claim 1, wherein the first and second set of couplers comprise magnetic couplers.

3. The connector of claim 2, wherein the magnetic couplers of the first set of couplers have opposite polarities with respect to corresponding magnetic couplers of the second set of couplers.

4. The connector of claim 1, wherein the toy body part thin material comprises chipboard.

5. The connector of claim 1, wherein the second opening comprises a smaller access opening portion with wires of the servo disposed therein.

6. The connector of claim 5, wherein the smaller access opening portion is disposed nearer one coupler of the second set of couplers than the other coupler of the second set of couplers.

7. The connector of claim 1, wherein the first opening is disposed on the first connector portion closer to one of the first set of couplers than the other of the first set of couplers.

8. The connector of claim 1, wherein the first opening comprises a curved opening and the second opening comprises a rectilinear opening.

9. The connector of claim 8, wherein the curved opening comprises a circular opening.

10. The connector of claim 1, wherein the rotator arm portion is coupled to move a toy appendage.

11. The connector of claim 1, wherein the rotator arm portion moves a toy appendage via mechanical and magnetic couplings.

12. The connector of claim 1, wherein the rotator arm portion is coupled to move a toy head.

13. The connector of claim 1, wherein the rotator arm portion moves a toy appendage under electrical control.

14. The connector of claim 1, wherein the first connector portion comprises a protruding portion that surrounds the first opening.

15. The connector of claim 1, wherein the toy body part thin material comprises part of a toy robot torso.

16. The connector of claim 1, wherein the first connector portion comprises a rotator arm cover enclosing the rotator arm, the rotator arm cover disposed around the first opening and having a shape corresponding to a portion of a housing of the servo disposed about the rotator arm.

17. A connector securing a servo to a toy body part thin material, comprising:
    a first connector portion including:
        a first set of couplers, and
        a first opening;
    a second connector portion including:
        a second set of couplers, each coupler of the second set of couplers corresponding to a different one of the couplers of the first set of couplers, and
        a second opening comprising a smaller access opening portion;
    a toy body part thin material comprising a third opening; and
wherein a rotator arm portion of a servo extends through the first opening to protrude from one side of the first connector portion, the third opening fits around the servo, and the first and second connector portions secure the toy body part thin material to a portion of the servo on an opposite side of the first connector portion from the one side that the rotator arm portion extends through and protrudes from.

* * * * *